US008311107B2

(12) United States Patent
Odagiri et al.

(10) Patent No.: US 8,311,107 B2
(45) Date of Patent: Nov. 13, 2012

(54) IMAGE DATA COMPRESSION DEVICE, COMPRESSING METHOD, IMAGE DATA DECOMPRESSION DEVICE, DECOMPRESSING METHOD, AND RECORDING MEDIUM

(75) Inventors: Junichi Odagiri, Kawasaki (JP);
Hironori Yahagi, Kawasaki (JP);
Shigeru Yoshida, Gamagori (JP)

(73) Assignee: Fujitsu Limited, Kawasaki (JP)

( * ) Notice: Subject to any disclaimer, the term of this patent is extended or adjusted under 35 U.S.C. 154(b) by 1001 days.

(21) Appl. No.: 12/267,975

(22) Filed: Nov. 10, 2008

(65) Prior Publication Data

US 2009/0052530 A1   Feb. 26, 2009

Related U.S. Application Data

(63) Continuation of application No. PCT/JP2006/316106, filed on Aug. 16, 2006.

(30) Foreign Application Priority Data

May 17, 2006   (JP) .................................. 2006-138070

(51) Int. Cl.
*H04N 7/12* (2006.01)
(52) U.S. Cl. ................................................. 375/240.12
(58) Field of Classification Search .............. 375/240.12
See application file for complete search history.

(56) References Cited

U.S. PATENT DOCUMENTS

| | | | |
|---|---|---|---|
| 4,571,618 A | | 2/1986 | Hatori et al. |
| 4,633,325 A | | 12/1986 | Usubuchi |
| 5,177,622 A | * | 1/1993 | Yoshida et al. ............... 382/251 |
| 6,292,587 B1 | * | 9/2001 | Toho ............................. 382/238 |
| 7,650,039 B2 | * | 1/2010 | Kajiwara et al. .............. 382/238 |
| 7,689,048 B2 | * | 3/2010 | Matsumoto et al. .......... 382/232 |
| 2003/0058481 A1 | * | 3/2003 | Bossen ...................... 358/426.13 |
| 2005/0141615 A1 | | 6/2005 | Kim |

FOREIGN PATENT DOCUMENTS

| | | |
|---|---|---|
| CN | 1394429 A | 1/2003 |
| JP | A 58-36090 | 3/1983 |

(Continued)

OTHER PUBLICATIONS

"Advances in Picture coding", Proceedings of the IEEE, Vol. 73. No. 4, Apr. 1985 to Musmann et al.*

(Continued)

*Primary Examiner* — Mehrdad Dastouri
*Assistant Examiner* — Mohammed Rahaman
(74) *Attorney, Agent, or Firm* — Greer, Burns & Crain Ltd.

(57) ABSTRACT

A quantizer quantizes a "prediction error" as a difference value between a pixel X to be compressed and a prediction value X'. A variable-length encoder inputs a quantization number obtained from a quantization table of the quantizer, and outputs a variable-length code (compressed code). A prediction value candidate calculation module calculates candidates 1 through k for a prediction value on the basis of peripheral pixels A, C, and B, and transmits them to a multiplexer (MPX). A prediction value determination module determines a prediction value among the candidates 1 through k for a prediction value on the basis of an intermediate value correspondence table and an intermediate value—image format correspondence table depending on an image format, and transmits a control signal to the multiplexer (MPX). The multiplexer (MPX) outputs one of the candidates 1 through k for a prediction value as a prediction value X'.

9 Claims, 26 Drawing Sheets

FOREIGN PATENT DOCUMENTS

| | | |
|---|---|---|
| JP | A 2000-69479 | 3/2000 |
| JP | A 2001-61149 | 3/2001 |
| WO | WO 02/35825 | 5/2002 |

OTHER PUBLICATIONS

Hans Georg Musmann, et al., "Advances in Picture Coding," Proceedings of the IEEE, vol. 73, No. 4, pp. 523-548, Apr. 1985.

Takahiko Fukinuke, "TV Gazo no Tajigen Shingo Shori," The Nikkan Kogyo Shimbun, Ltd, pp. 221-231, Nov. 15, 1988.

Edited by the Institute of Electronics, Information and Communication engineers, Human Communication Kogaku Series Eizo Joho Fugoka, Ohmsha, Ltd., pp. 15-21, Dec. 20, 2001.

Japanese Office Action and its English Translation issued in corresponding Japanese Application No. 2008-515424 on Jan. 11, 2011.

Extended European Search Report issued in corresponding EP Application No. 06796465 on Jan. 28, 2011.

Torsten Seemann, et al., "Generalized Locally Adaptive DPCM," Department of Computer Science, Monash University. pp. 1-15, Jan. 25, 2000.

Josip Knezovic et al., "Gradient Based Selective Weighting of Neighboring Pixels for Predictive Lossless Image Coding," Information Technology Interfaces ITI 2003. pp. 483-488. Jun. 16-19, 2003.

First Office Action and its English translation issued in corresponding Chinese Patent Application No. 200680054589.7 on Jun. 9, 2010.

Korean Office Action and its English Translation issued in corresponding Application No. 10-2008-7029607 on Aug. 24, 2010.

* cited by examiner

| PREDICTION ERROR | PREDICTION ERROR QUANTIZATION VALUE | QUANTIZATION NUMBER |
|---|---|---|
| ~−21 | −28 | 7 |
| −8~−20 | −12 | 5 |
| −3~−7 | −4 | 3 |
| −2~2 | 0 | 1 |
| 3~7 | 4 | 2 |
| 8~20 | 12 | 4 |
| 21~ | 28 | 6 |

FIG. 5

| COMPARATOR OUTPUT ("1" IS TRUE) | | | INTERMEDIATE VALUE | PREDICTION VALUE |
|---|---|---|---|---|
| C≧A | B≧C | A≧B | | |
| 0 | 0 | 1 | C | (1) |
| 0 | 1 | 0 | A | (2) |
| 0 | 1 | 1 | B | (3) |
| 1 | 0 | 0 | B | (3) |
| 1 | 0 | 1 | A | (2) |
| 1 | 1 | 0 | C | (1) |
| 1 | 1 | 1 | A=B=C | (1) |
| 0 | 0 | 0 | NO OCCURRENCE | |

FIG. 6

| NUMBER | IMAGE HAVING STRONG PIXEL CORRELATION IN HORIZONTAL DIRECTION | IMAGE HAVING STRONG PIXEL CORRELATION IN VERTICAL DIRECTION |
|---|---|---|
| (1) | 000 "(A+C)/2" | 011 "C" |
| (2) | 001 "A" | 100 "A" |
| (3) | 010 "(2A+C−B)/2" | 101 "A+C−B" |

FIG. 7

| CONTROL SIGNAL | CANDIDATE FOR A PREDICTION VALUE TO BE USED |
|---|---|
| 000 | CANDIDATE 1 FOR A PREDICTION VALUE : (A+C)/2 |
| 001 | CANDIDATE 2 FOR A PREDICTION VALUE : A |
| 010 | CANDIDATE 3 FOR A PREDICTION VALUE : (2A+C-B)/2 |
| 011 | CANDIDATE 4 FOR A PREDICTION VALUE : C |
| 100 | CANDIDATE 5 FOR A PREDICTION VALUE : A |
| 101 | CANDIDATE 6 FOR A PREDICTION VALUE : A+C-B |

FIG. 8

| PIXEL NUMBR | i | i+1 | i+2 | i+3 | i+4 | i+5 | i+6 | i+7 |
|---|---|---|---|---|---|---|---|---|
| | 60 | 50 | 55 | 75 | 80 | 72 | 65 | 66 | 71 |

LINE BUFFER (008)

| 150 | 134 | 156 | 135 | 144 | 160 | 157 | 146 |
|---|---|---|---|---|---|---|---|

PIXEL TO BE COMPRESSED (002)

FIG. 10

| PIXEL NUMBER | A | B | C | X | A | (A+C)/2 | (2A+C−B)/2 | INTERMEDIATE VALUE (PREDICTION VALUE) | PREDICTION ERROR | PREDICTION ERROR QUANTIZATION VALUE | INTERMEDIATE VALUE + PREDICTION ERROR QUANTIZATION VALUE | QUANTIZATION NUMBER |
|---|---|---|---|---|---|---|---|---|---|---|---|---|
| i | 150 | 60 | 50 | 150 | 150 | 100 | 145 | 145 | 5 | 4 | 149 | 2 |
| i+1 | 149 | 50 | 55 | 134 | 149 | 102 | 152 | 149 | −15 | −12 | 137 | 5 |
| i+2 | 137 | 55 | 75 | 156 | 137 | 106 | 147 | 137 | 19 | 12 | 149 | 4 |
| i+3 | 149 | 75 | 80 | 135 | 149 | 115 | 152 | 149 | −14 | −12 | 137 | 5 |
| i+4 | 137 | 80 | 72 | 144 | 137 | 105 | 133 | 133 | 11 | 12 | 145 | 4 |
| i+5 | 145 | 72 | 65 | 160 | 145 | 105 | 142 | 142 | 18 | 12 | 154 | 4 |
| i+6 | 154 | 65 | 66 | 157 | 154 | 110 | 155 | 154 | 3 | 4 | 158 | 2 |
| i+7 | 158 | 66 | 71 | 146 | 158 | 115 | 161 | 158 | −12 | −12 | 146 | 5 |

FIG. 11

| PIXEL NUMBER | A | B | C | X | A | C | A+C-B | INTERMEDIATE VALUE (PREDICTION VALUE) | PREDICTION ERROR | PREDICTION ERROR QUANTIZATION VALUE | INTERMEDIATE VALUE + PREDICTION ERROR QUANTIZATION VALUE | QUANTIZATION NUMBER |
|---|---|---|---|---|---|---|---|---|---|---|---|---|
| i | 150 | 60 | 50 | 150 | 150 | 50 | 140 | 140 | 10 | 12 | 152 | 4 |
| i+1 | 152 | 50 | 55 | 134 | 152 | 55 | 157 | 152 | -18 | -12 | 140 | 5 |
| i+2 | 140 | 55 | 75 | 156 | 140 | 75 | 160 | 140 | 16 | 12 | 152 | 4 |
| i+3 | 152 | 75 | 80 | 135 | 152 | 80 | 157 | 152 | -17 | -12 | 140 | 5 |
| i+4 | 140 | 80 | 72 | 144 | 140 | 72 | 132 | 132 | 12 | 12 | 144 | 4 |
| i+5 | 144 | 72 | 65 | 160 | 144 | 65 | 137 | 137 | 23 | 28 | 165 | 6 |
| i+6 | 165 | 65 | 66 | 157 | 165 | 66 | 166 | 165 | -8 | -12 | 153 | 5 |
| i+7 | 153 | 66 | 71 | 146 | 153 | 71 | 158 | 153 | -7 | -4 | | 3 |

FIG. 12

| QUANTIZATION NUMBER | PREDICTION ERROR QUANTIZATION VALUE |
|---|---|
| 7 | −28 |
| 5 | −12 |
| 3 | −4 |
| 1 | 0 |
| 2 | 4 |
| 4 | 12 |
| 6 | 28 |

F I G. 1 5

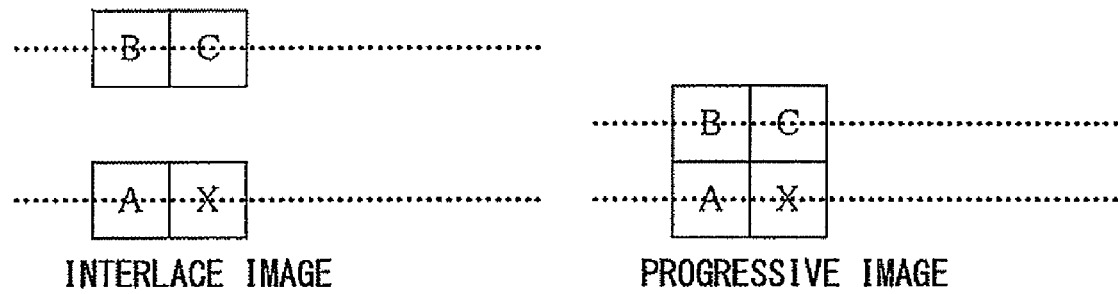
F I G. 16

| OUTPUT OF COMPARATOR ("1" IS TRUE) | | | INTERMEDIATE VALUE | PREDICTION VALUE |
|---|---|---|---|---|
| C≧A | B≧C | A≧B | | |
| 0 | 0 | 1 | C | (1) |
| 0 | 1 | 0 | A | (2) |
| 0 | 1 | 1 | B | (3) |
| 1 | 0 | 0 | B | (3) |
| 1 | 0 | 1 | A | (2) |
| 1 | 1 | 0 | C | (1) |
| 1 | 1 | 1 | A=B=C | (1) |
| 0 | 0 | 0 | NO OCCURRENCE | |

FIG. 17

| NUMBER | IMAGE HAVING STRONG PIXEL CORRELATION IN HORIZONTAL DIRECTION | IMAGE HAVING STRONG PIXEL CORRELATION IN VERTICAL DIRECTION |
|---|---|---|
| (1) | 000"(A+C)/2" | 011"C" |
| (2) | 001"A" | 100"A" |
| (3) | 010"(2A+C−B)/2" | 101"A+C−B" |

FIG. 18

| CONTROL SIGNAL | CANDIDATE FOR A PREDICTION VALUE TO BE USED |
|---|---|
| 000 | CANDIDATE 1 FOR A PREDICTION VALUE1 : (A+C)/2 |
| 001 | CANDIDATE 2 FOR A PREDICTION VALUE : A |
| 010 | CANDIDATE 3 FOR A PREDICTION VALUE : (2A+C-B)/2 |
| 011 | CANDIDATE 4 FOR A PREDICTION VALUE : C |
| 100 | CANDIDATE 5 FOR A PREDICTION VALUE : A |
| 101 | CANDIDATE 6 FOR A PREDICTION VALUE : A+C-B |

FIG. 19

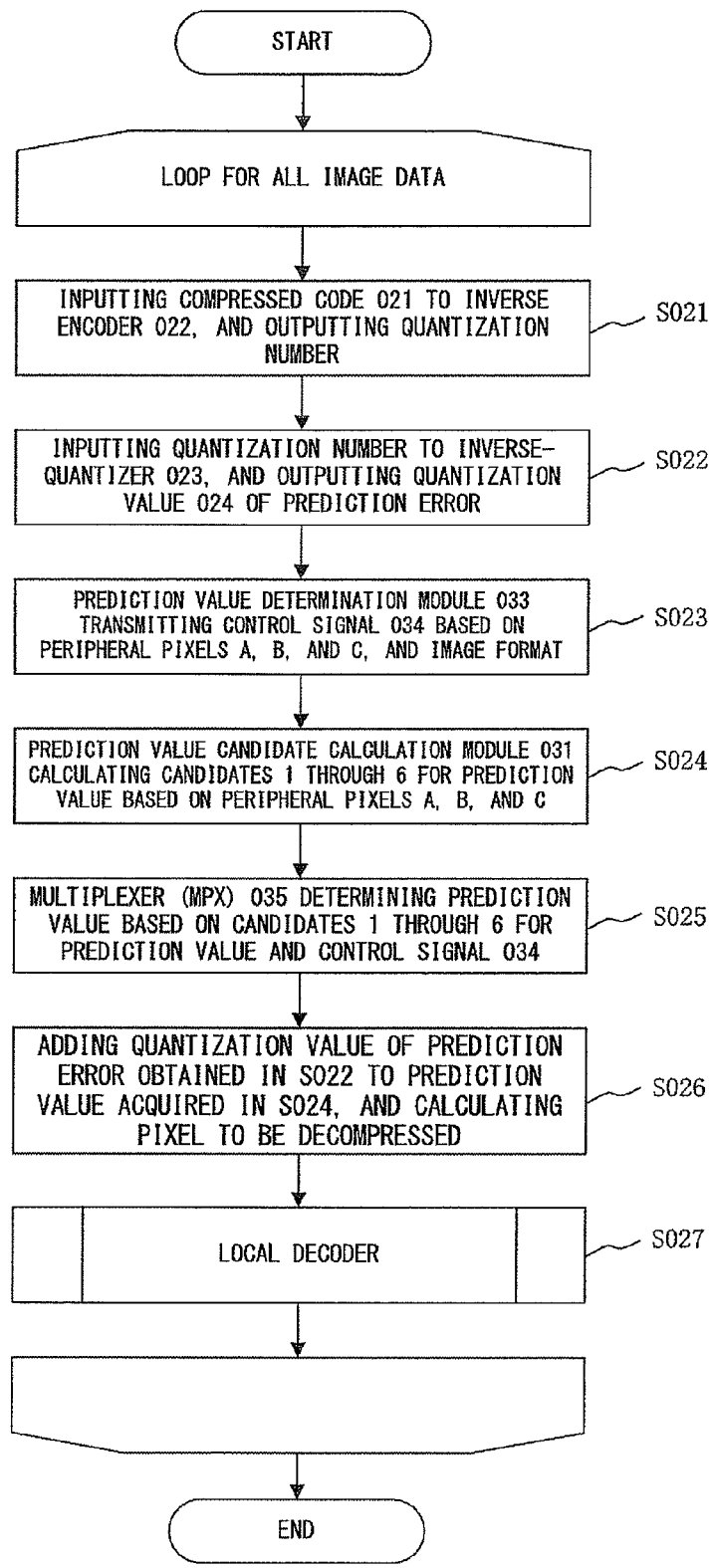
F I G. 2 0 A

PIXEL
NUMBER    i    i+1    i+2    i+3    i+4    i+5    i+6    i+7

| 60 | 50 | 55 | 75 | 80 | 72 | 65 | 66 | 71 |

LINE BUFFER (028)

FIG. 21

| PIXEL NUMBER | QUANTIZATION VALUE | PREDICTION ERROR QUANTIZATION VALUE | A | B | C | X | A | (A+C)/2 | (2A+C-B)/2 | INTERMEDIATE VALUE (PREDICTION VALUE) | INTERMEDIATE VALUE + PREDICTION ERROR QUANTIZATION VALUE |
|---|---|---|---|---|---|---|---|---|---|---|---|
| i | 2 | 4 | 150 | 60 | 50 | 150 | 150 | 100 | 145 | 145 | 149 |
| i+1 | 5 | -12 | 149 | 50 | 55 | 134 | 149 | 102 | 152 | 149 | 137 |
| i+2 | 4 | 12 | 137 | 55 | 75 | 156 | 137 | 106 | 147 | 137 | 149 |
| i+3 | 5 | -12 | 149 | 75 | 80 | 135 | 149 | 115 | 152 | 149 | 137 |
| i+4 | 4 | 12 | 137 | 80 | 72 | 144 | 137 | 105 | 133 | 133 | 145 |
| i+5 | 4 | 12 | 145 | 72 | 65 | 160 | 145 | 105 | 142 | 142 | 154 |
| i+6 | 2 | 4 | 154 | 65 | 66 | 157 | 154 | 110 | 155 | 154 | 158 |
| i+7 | 5 | -12 | 158 | 66 | 71 | 146 | 158 | 115 | 161 | 158 | 146 |

F I G. 2 2

| PIXEL NUMBER | QUANTIZATION VALUE | PREDICTION ERROR QUANTIZATION VALUE | A | B | C | X | A | C | A+C-B | INTERMEDIATE VALUE (PREDICTION VALUE) | INTERMEDIATE VALUE + PREDICTION ERROR QUANTIZATION VALUE |
|---|---|---|---|---|---|---|---|---|---|---|---|
| i | 4 | 12 | 150 | 60 | 50 | 150 | 150 | 50 | 140 | 140 | 152 |
| i+1 | 5 | -12 | 152 | 50 | 55 | 134 | 152 | 55 | 157 | 152 | 140 |
| i+2 | 4 | 12 | 140 | 55 | 75 | 156 | 140 | 75 | 160 | 140 | 152 |
| i+3 | 5 | -12 | 152 | 75 | 80 | 135 | 152 | 80 | 157 | 152 | 140 |
| i+4 | 4 | 12 | 140 | 80 | 72 | 144 | 140 | 72 | 132 | 132 | 144 |
| i+5 | 6 | 28 | 144 | 72 | 65 | 160 | 144 | 65 | 137 | 137 | 165 |
| i+6 | 5 | -12 | 165 | 65 | 66 | 157 | 165 | 66 | 166 | 165 | 153 |
| i+7 | 3 | -4 | 153 | 66 | 71 | 146 | 153 | 71 | 158 | 153 | |

FIG. 23

IMAGE DATA COMPRESSION DEVICE, COMPRESSING METHOD, IMAGE DATA DECOMPRESSION DEVICE, DECOMPRESSING METHOD, AND RECORDING MEDIUM

CROSS REFERENCE TO RELATED APPLICATION

This application is a continuation application of international PCT application No. PCT/JP2006/316106 filed on Aug. 16, 2006.

BACKGROUND OF THE INVENTION

1. Field of the Invention

The present invention relates to an image data compression device and a compressing method capable of processing two types (natural images such as movies etc. and CG images such as a digital map etc.) of high quality images having different characteristics in real time, and a recording medium for performing the compression, and an image data decompression device and a decompressing method for decompressing compressed image data, and a recording medium for decompressing compressed image data.

2. Description of the Related Art

It is necessary to compress data to transmit image information containing an large amount of information. Especially, since 30 through 60 frames of image data are transmitted and received for moving pictures, the data compression is required.

It is well known that image information can be natural images such as general television images, movies, etc. and CG images (CG images) represented by maps for car navigation etc. Generally, natural images contain a number of low-frequency components, and digital images contain a number of high-frequency components. In a recent mobile terminal such as a car-mounted terminal, a mobile telephone, etc., both digital images such as a map etc. and natural images such as TV and movie pictures etc. are processed. To efficiently transmit both types of image data, an effective data compressing system for both low-frequency components and high-frequency components is desired.

The first conventional technology of compressing data using a JPEG (joint photographic experts group) and MPEG (moving picture experts group) shown in FIG. 1 is known as a common conventional image data compressing system. The following patent documents 1 and 2 belong to the first conventional technology. As shown in FIG. 1, the first conventional technology divides image data 110 into blocks (normally 8*8 pixels), performs frequency conversion 210 on the block image, performs quantization 310 on a DCT coefficient, performs variable-length encoding 410 for assigning a code depending on the frequency of occurrence, and transmits the result. The frequency conversion is to convert the frequency of image data normally using a DCT (discrete cosine transfer). Since human eyes are sensitive to low-frequency components (flat portion in an image), the DCT coefficient for a low frequency is precisely quantized, and the DCT coefficient for a high frequency is roughly quantized, thereby compressing natural images at a high compression rate at which image degradation can be inconspicuous. However, there is no problem with the compression of natural images when conspicuous low-frequency components are precisely quantized, but the image degradation is conspicuous on the high-frequency components such as a line and a character in map images (CG images). Furthermore, since edge information extraction 230 is performed on a block to be compressed, there is the problem that correction and feedback cannot be performed by detecting the image degradation caused by a quantization error. Therefore, it is not appropriate for CG images.

In addition, the second conventional technology using the JPEG-LS (lossless) as shown in FIG. 2 is known as a conventional image data compressing system. The second conventional technology predicts a level value using a MED (median edge detector) prediction device (the prediction device is a type of MAP (median adaptive predictor) from a level value of a pixel to be compressed when the image data 120 is compressed as sown in FIG. 2, and directly encodes prediction error. In this second conventional technology, since the frequency of occurrence of the prediction error basically concentrates on the vicinity of 0, the prediction error in the vicinity of 0 is assigned a short code while a prediction error having a large value is assigned a long code for compression. Although the compression rate is about 1/3, the encoding process is performed in a pixel unit regardless of high or low frequencies. Accordingly, no image degradation occurs even on CG images.

However, it is difficult to predict an interlace image and an image having low correlation between lines, and prediction error normally increases on these images. As a result, a variable-length code having a low frequency of occurrence (long code length) is assigned, and it is necessary to perform calculating process during encoding. Thus, each process becomes heavy and is not appropriate for real-time compressing process.

The prediction error is conspicuous on CG images when transfer or coding is performed by DCT such as the JPEG, MPEG, etc. while the prediction error on an interlace image and a landscape image is troublesome. Therefore, a long code is frequently used, and reduces compression efficiency.

Thus, a car-mounted image data compression device for processing both natural images and CG images has to compress CG images with high quality, and maintain the compression efficiency for interlace images and landscape images in movies and natural images.

Patent Document 1: Japanese Published Patent Application No. 2001-061149

Patent Document 2: Japanese Published Patent Application No. 2000-069479

SUMMARY OF THE INVENTION

To solve the above-mentioned problems, the present invention aims at providing an image data compression device and compressing method for predicting the level value of a pixel to be predicted from the level value of a pixel around the pixel to be predicted, and quantizing the error of a prediction result to compress data, and a program for performing the compression, and a image data decompression device and decompressing method for decompressing compressed image data, and a program for performing the decompression.

The image data compression device according to the present invention has a prediction device and predicts a pixel level value of a pixel to be compressed by the prediction device. In this case, a prediction value is determined on the basis of the pixel level value around the pixel to be compressed and an image format. Thus, a prediction error can be reduced for each image format, and the compression efficiency can be enhanced. In addition, since only a prediction value is to be switched depending on the image format, the program for implementation and the configuration of a circuit can be simplified.

In addition, the image data compressing method according to the present invention includes a step of calculating a plurality of candidates for a prediction value on the basis of the stored peripheral pixel values of the pixels A, B, and C, and a step of determining which of the plurality of candidates for a prediction value is determined as a prediction value on the basis of the intermediate value correspondence table and the intermediate value—image format correspondence table, and transmitting a control signal. Thus, in each of the prediction value determination module and the prediction value calculation module, parallel processing is performed, and when the calculation of each candidate for a prediction value is completed, the prediction value to be used can be determined. Therefore, data can be compressed at a high speed by the parallel processing.

The recording medium on which is recorded a program according to the present invention for compressing image data is to compress image data while predicting a pixel level value of a pixel to be decompressed, and directs a computer to perform: a step of defining the pixels around a pixel to be compressed before encoding, that is, defining the left pixel as a pixel A, the upper pixel as a pixel C, and the upper left pixel as a pixel B, and holding the pixel values of the pixels A, B, and C, and the pixel values in the preceding line; a step of calculating a plurality of candidates for a prediction value on the basis of the stored pixel values of the pixels A, B, and C; a step of narrowing the plurality of candidates for a prediction value according to the intermediate value correspondence table and the intermediate value—image format correspondence table, determining one prediction value, and output the value; and a step of calculating a prediction error from the output prediction value and the pixel to be compressed, inputting the prediction error to a quantization table and obtaining a compressed code. Thus, parallel processing is performed in each step of the prediction value determining and prediction value calculating steps, and it can be determined which prediction value is to be used when each candidate for a prediction value is completed. Therefore, data can be compressed at a high speed by the parallel processing.

In addition, since the image data decompression device and the image data decompressing method according to the present invention decompress image data compressed by the image data compression device in the reverse operation, the prediction error can be reduced for each image format as with the image data compression device, thereby enhancing the compression efficiency. Additionally, only by switching the prediction value depending on the image format, a program for implementation and the configuration of a circuit can be simplified.

Since the recording medium on which is recorded a program for decompressing image data according to the present invention decompresses image data compressed by the above-mentioned program for compressing image data in the reverse operation, as with the above-mentioned program for compressing image data, parallel processing is performed in each step of the prediction value determining and prediction value calculating steps, and it can be determined which prediction value is to be used when each candidate for a prediction value is completed. Therefore, data can be compressed at a high speed by the parallel processing.

BRIEF DESCRIPTION OF THE DRAWINGS

FIG. 5 shows a quantization table in the quantizer according to an embodiment of the present invention;

FIG. 6 shows the inverse quantization table in the prediction value determination module of the image data compression device according to an embodiment of the present invention;

FIG. 7 shows the intermediate value—image format correspondence table in the prediction value determination module of the image data compression device according to an embodiment of the present invention;

FIG. 8 shows a correspondence table indicating the correspondence between the control signal of the image data compression device and the candidate for candidates 1 through k for a prediction value according to an embodiment of the present invention;

FIG. 10 shows a pixel to be compressed in the image data compression device and the pixel level value at a time point of a line buffer for prediction according to an embodiment of the present invention;

FIG. 11 shows a quantization result of the prediction device for an interlace image in the image data compression device according to an embodiment of the present invention;

FIG. 12 shows a quantization result of the prediction device for a progressive image in the image data compression device according to an embodiment of the present invention;

FIG. 15 shows an inverse quantization table in the inverse-quantizer according to an embodiment of the present invention;

FIG. 16 shows the arrangement of the pixel to be decompressed and the peripheral pixels in the image data decompression device according to an embodiment of the present invention;

FIG. 17 shows an inverse quantization table in the prediction value determination module of the image data decompression device according to an embodiment of the present invention;

FIG. 18 shows an intermediate value—image format correspondence table in the prediction value determination module of the image data decompression device according to an embodiment of the present invention;

FIG. 19 shows a correspondence table indicating the correspondence between the control signal and the candidates 1 through k for a prediction value of the image data decompression device according to an embodiment of the present invention;

FIG. 20A is a flowchart for explanation of the operation of the image data decompression (decoding) device according to an embodiment of the present invention;

FIG. 21 shows the pixel level value at a time point of a line buffer for prediction in the image data compression device and according to an embodiment of the present invention;

FIG. 22 shows a quantization result of the prediction device for an interlace image in the image data decompression device according to an embodiment of the present invention;

FIG. 23 shows a quantization result of the prediction device for a progressive image in the image data decompression device according to an embodiment of the present invention;

DESCRIPTION OF THE PREFERRED EMBODIMENT

The embodiments of the present invention are described below with reference to the attached drawings.

Figure 1:
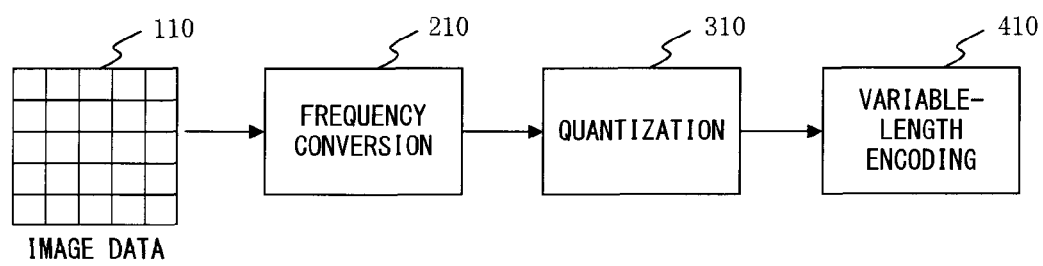
FIG. 1 shows the first conventional technology for compressing data by the JPEG and MPEG.
Figure 2:
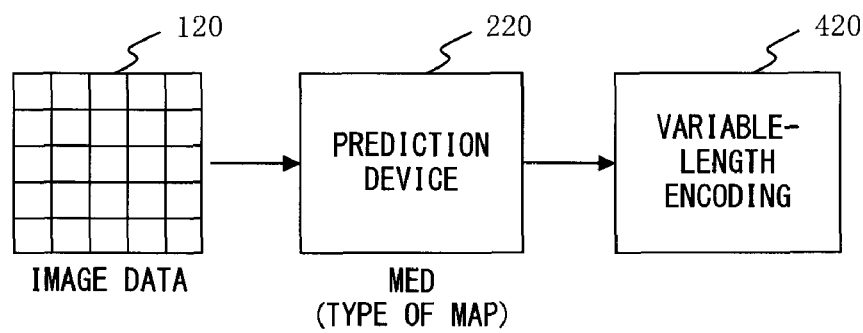
FIG. 2 shows the second conventional technology for compressing data by the JPEG-LS.
Figure 3:
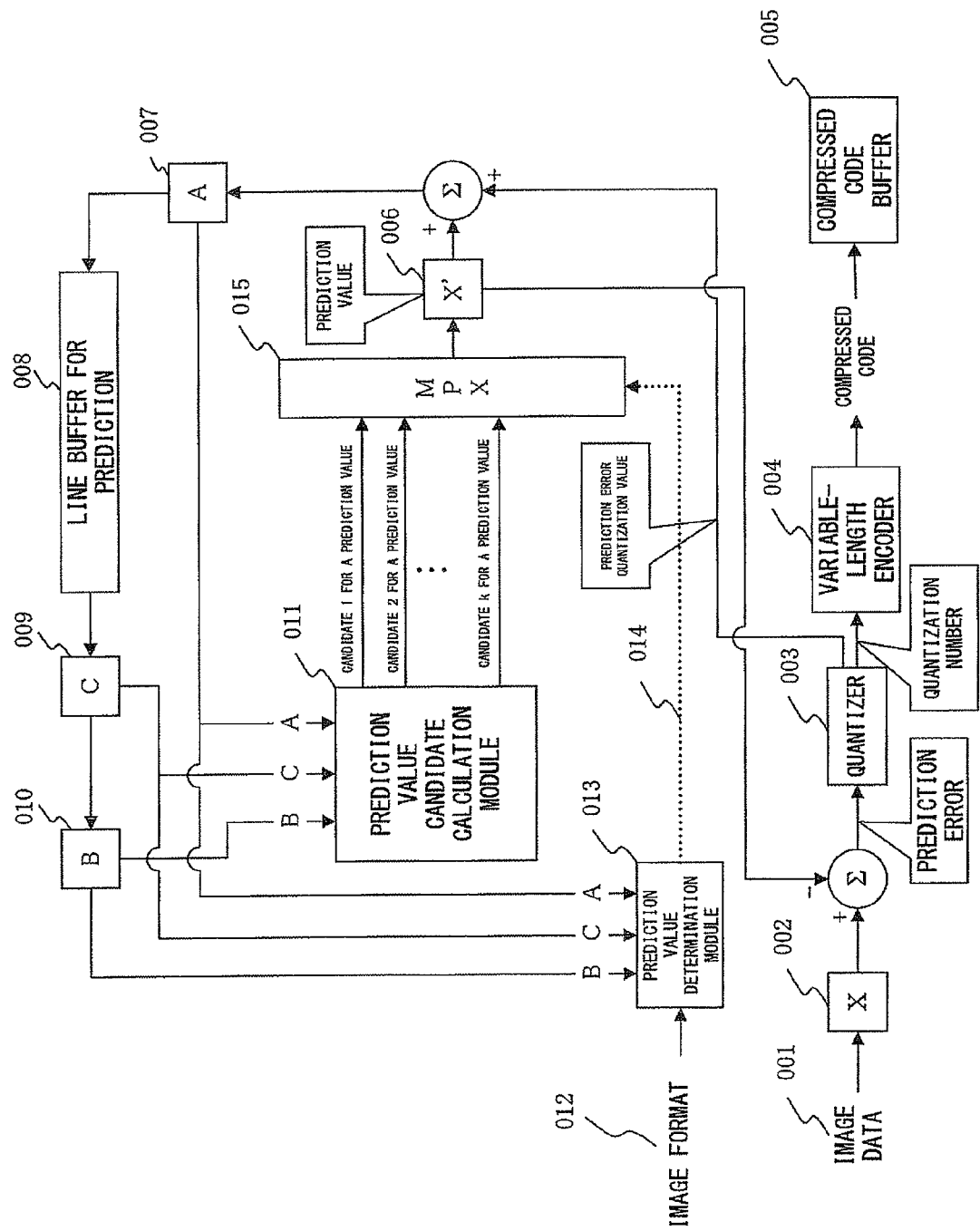
FIG. 3 is a block diagram of the configuration of the image data compression device according to an embodiment of the present invention.
Figure 4:
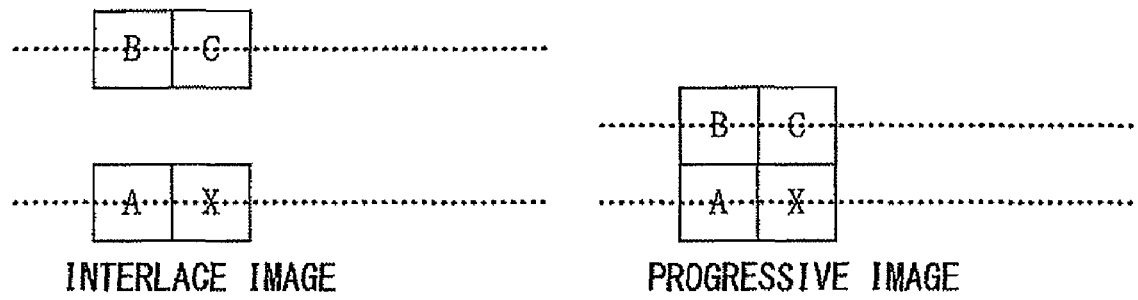
FIG. 4 shows the arrangement of a pixel to be compressed and peripheral pixels in the image data compression device according to an embodiment of the present invention.

FIG. 3 is a block diagram of the configuration of the image data compression (encoding) device according to an embodiment of the present invention. In FIG. 3, image data 001 indicates a group of pixels to be compressed, and is extracted by an image processing device (not shown in the attached drawings) for digitally processing images. Then, a pixel X (002) to be compressed indicates a pixel to be compressed in the current step. FIG. 4 shows the arrangement of a pixel X to be compressed and peripheral pixels in the image format of an interlace image or a progressive image. In FIG. 4, the lines are indicated by broken lines. A quantizer 003 quantizes a "prediction error" as a difference value between the pixel X (002) to be compressed and a prediction value X' (006).

FIG. 5 shows an example of a quantization table indicating the correspondence between the prediction error (X-X') and the quantization value and the quantization number according to an embodiment of the present invention. The quantization table shown in FIG. 5 receives a prediction error (X-X'), and outputs a prediction error quantization value (also referred to simply as a quantization value) and a quantization number. It is desired that the widths of the quantizing steps are narrower for smaller absolute values of prediction error, and wider for larger absolute values of prediction error for the following reason. Generally, when a prediction error is small, it refers to a flat image which can be easily predicted. On the other hand, when a prediction error is large, it refers to the vicinity of an edge which cannot be easily predicted. If there is an error in a flat portion, it can be easily detected by human eyes. Therefore, when a prediction error is small, it is necessary to narrow the step width. It is desired that the minimum step width is 1 through 4 depending on the necessity of the adaptive quantization. On the other hand, it is desired that the step width is 24 through 32 when prediction error is large because the frequency of occurrence is low and it is necessary to represent one quantizing step for a large number of prediction errors to enhance the compression efficiency. In addition, when a complicated pattern having a number of edges is compressed, there is the possibility that a predetermined compression rate cannot be attained. Therefore, when a predetermined compression rate can be exceeded by a plurality of quantization tables having different quantizing step widths, adaptive quantization of selecting a totally rough quantization table in step width can be performed. Furthermore, it is necessary that the correspondence between the quantization value and the quantization number shown in FIG. 5 is consistent between the compressing side and the decompressing side. Therefore, the decompressing side is provided with an inverse quantization table (FIG. 15) showing the correspondence between the quantization value and the quantization number with respect to FIG. 5. It is described later.

A variable-length encoder 004 receives a quantization number obtained from the quantization table shown in FIG. 5 and outputs a variable-length code. A compressed code buffer 005 temporarily stores the variable-length code output from the variable-length encoder 004, that is, the compressed code.

The prediction value X' (006) is one of the candidates for a prediction value selected by a multiplexer (MPX) 015 from among the candidates 1 through k (k=6 in the description of the present embodiment) for a prediction value calculated by a prediction value candidate calculation module 011. A peripheral pixel A (007) is a pixel left to the pixel X (002) to be compressed, that is, a previous pixel processed in the same line as shown in FIG. 4. A line buffer 008 for prediction holds about 1 line of quantization results for prediction, and is configured by, for example, a shift register. As shown in FIG. 4, a peripheral pixel C (009) is a pixel above the pixel X to be compressed, that is, a pixel in the same column in the line processed in the preceding line. A peripheral pixel B (010) is a pixel upper left to the pixel X to be compressed, that is, a previous pixel processed to the pixel C (009) in the previous line processed. In the original image, the peripheral pixel C and the peripheral pixel B are pixels in the second line above the pixel X to be compressed in the interlace image and in the line immediately above in the progressive image.

The prediction value X' (006) is one of the candidates for a prediction value calculated by the prediction value candidate calculation module 011 on the basis of the peripheral pixels A (007), C (009), and B (010), but the calculation of a candidate for a prediction value when the image format is a progressive image is first described below. As shown in FIG. 4, in the case of a progressive image, using the pixel level values of the two pixels C and B in the previous line processed and the prediction level value of the previous pixel processed in the same line, the candidate for a prediction value for the prediction value X' (006) is A, C, (A+C−B) with the correlation among three directions taken into account.

Described next is the calculation of a candidate for a prediction value when the image format is an interlace image. As shown in FIG. 4, in the case of an interlace image, an even line and an odd line are alternately transmitted. Therefore, when processing is performed in a line unit without frame memory, pixels processed in the second line above, which have weaker correlations, are used. Therefore, without using the pixel level values of the pixels C and B in the second previous line processed, the pixels C' (pixel between the pixel X and the pixel C) and B' (pixel between the pixel A and the pixel B) are considered. To process the pixels as in the case of the above-mentioned progressive image, the pixel level value of the pixel C' is defined as an interpolation value "(A+C)/2" between the pixels A and C, and the level value of the pixel B' is calculated using the interpolation value "(2A+C−B)/2" between the pixels A and B. Furthermore, the candidate for a prediction value for the prediction value X' (006) is defined as A, (A+C)/2, (2A+C−B)/2 using the pixel level value of the pixel A as the previous pixel processed in the same line in addition to the pixel C' and the pixel B', that is, with the correlation among the three directions taken into account.

Thus, the prediction value candidate calculation module 011 calculates the following candidates 1 through k for a prediction value on the basis of the peripheral pixels A (007), C (009), and B (010), and transmits the calculation results to the multiplexer (MPX) 015.

candidate for a prediction value 1: (A+C)/2
candidate for a prediction value 2: A candidate for a prediction value 3: (2A+C−B)/2
candidate for a prediction value 4: C
candidate for a prediction value 5: A
candidate for a prediction value 6: A+C−B In the calculation above, the prediction value candidate calculation module 011 can determine a prediction value for an interlace image as an intermediate value of three candidates for a prediction value "A", "(m*A+n*C)/(m+n)", and "A+(m*A+n*C)/(m+n)−(m*A+n*B)/(m+n)" using coefficients m and n that are values (positive integers including 0) other than 0, and a sum of m and n is a value of i-th power of 2 so that the process in the shift operation can be performed. To obtain the above-mentioned prediction value, the prediction value candidate calculation module 011 calculates the three candidates for a prediction value "A", "(m*A+n*C)/(m+n)", and "A+(m*A+n*C)/(m+n)−(m*A+n*B)/(m+n)" as the candidates for a prediction value 7 through 9 in addition to the above-mentioned candidates for a prediction value 1 through 6. As a result, the value of k is 9. That is, to an interlace image with the coefficients m and n taken into account, one image format is added in addition to the interlace image or the progressive image without the consideration of the above-mentioned coefficients. Therefore, the value of k is 9. Furthermore, if the number of image format increases, the number of k is three times the number of the image formats. As the coefficients m and n, for example, as an interlace-oriented prediction value using m=1 and n=2, a prediction value that is strong against the fluctuation of the pixel level value in the vertical direction can be calculated using "A", "(A+3° C.)/4", and "(4*A+3*C−3*B)/4". That is, for the image having a strong correlation in the vertical direction is processed using the value of n larger than the value of m. The values of the above-mentioned coefficients in the case of a progressive image are m=0 and n=1 so that a prediction value similar to the value obtained for the conventional MAP prediction device can be acquired.

The image format 012 is presented from the image processing device (not shown in the attached drawings) to the image data compression device. However, an image data format is generally represented as a signal indicating in which direction the image has a strong pixel correlation, the horizontal direction or the vertical direction. That is, the above-mentioned interlace image has a strong pixel correlation in the horizontal direction, and the above-mentioned progressive image has a strong pixel correlation in the vertical direction (the pixel correlation in the horizontal direction is not necessarily stronger than the pixel correlation in the vertical direction). The same holds true with the case in which the image format is a sampling format of the image data according to the signal.

The prediction value determination module 013 determines which in the candidates 1 through k for a prediction value is set as a prediction value on the basis of two correspondence tables shown in FIGS. 6 and 7, and transmits it as a control signal 014 to the multiplexer (MPX) 015. FIG. 6 is an intermediate value correspondence table for comparing the pixel level values of the peripheral pixels A, B, and C, calculating the intermediate value of the peripheral pixels A, B, and C, and narrowing the candidates for a prediction value into the candidates (1) through (3) for a prediction value. The correspondence between the candidates (1) through (3) for a prediction value and the intermediate value shown in FIG. 6 has to be consistent between the compressing side and the decompressing side. Therefore, with respect to FIG. 6, the decompressing side is provided with the intermediate value correspondence table (FIG. 17) indicating the correspondence between the candidates (1) through (3) for a prediction value and an intermediate value. It is described later.

FIG. 7 is an intermediate value—image format correspondence table used in transmitting to the multiplexer (MPX) 015 the candidates (1) through (3) for a prediction value narrowed in FIG. 6 and the control signal 014 indicating which in the candidates 1 through k for a prediction value is finally to be used as a prediction value depending on whether the image format 012 is an image (interlace image) having a strong pixel correlation in the horizontal direction or an image (progressive image) having a strong pixel correlation in the vertical direction. What is output as the control signal 014 is a 3-bit (000~101) signal as shown in the correspondence table in FIG. 7. In addition, as described above, when the calculation output of the three candidates for a prediction value "A", "(m*A+n*C)/(m+n)", and "A+(m*A+n*C)/(m+n)−(m*A+n*B)/(m+n)" about an interlace image with the coefficients m and n taken into account is added, the candidates for a prediction value "A", "(m*A+n*C)/(m+n)", and "A+(m*A+n*C)/(m+n)−(m*A+n*B)/(m+n)" identified by a control signal (represented by 4 bits in this case) are added to the image column having a strong pixel correlation in the horizontal direction with respect to the candidates (1) through (3) for a prediction value. In addition, the correspondence between the intermediate value an the image format shown in FIG. 7 is to be consistent between the compressing side and the decompressing side. Therefore, with respect to FIG. 7, the decompressing side is provided with an intermediate value—image format correspondence table (FIG. 18) indicating the correspondence between the intermediate value and the image format. It is described later.

The multiplexer (MPX) 015 determines which of the candidates 1 through k for a prediction value is selected as a prediction value according to the control signal 014. FIG. 8 is a correspondence table showing the correspondence between the control signal 014 and the above-mentioned candidates for a prediction value 1 through 6. That is, a control signal (000) corresponds to a candidate 1 for a prediction value, a control signal (001) corresponds to a candidate 2 for a prediction value, a control signal (010) corresponds to a candidate 3 for a prediction value, a control signal (011) corresponds to a candidate 4 for a prediction value, a control signal (100) corresponds to a candidate 5 for a prediction value, and a control signal (101) corresponds to the candidate 6 for a prediction value. As described above, when the calculation output of the three candidates for a prediction value "A", "(m*A+n*C)/(m+n)", and "A+(m*A+n*C)/(m+n)−(m*A+n*B)/(m+n)" for an interlace image with the coefficients m and n taken into account are added from the prediction value candidate calculation module 011, the candidates for a prediction value "A", "(m*A+n*C)/(m+n)", and "A+(m*A+n*C)/(m+n)−(m*A+n*B)/(m+n)" are added as the candidates for a prediction value to be used in the table shown in FIG. 8. In addition, a control signal (a 4-bit signal in this case) having a bit width for identification of the three candidates for a prediction value with the control signal added is required. The correspondence between the control signal and the candidate for a prediction value shown in FIG. 8 is to be consistent between the compressing side and the decompressing side. With respect to FIG. 8, a correspondence table (FIG. 19) showing the correspondence between the control signal and the candidate for a prediction value is provided for the decompressing side. It is described later. Although 3-bit control signals (000) through (101) are associated as the control signal 014 according to the present embodiment, the control signal not in this format can also be used so far as the candidates 1 through 6 for a prediction value can be associated.

In addition, a correspondence table indicating according to the signal about a sampling format of image data which prediction value is to be used is stored in the prediction value determination module 013 regardless of the interlace image or the progressive image, and a prediction value can be determined on the basis of the correspondence table.

Although not shown in the attached drawings, a control signal indicating the sampling format of the image data is transmitted from the prediction value determination module 013 to the prediction value candidate calculation module 011. Based n the signal, the prediction value candidate calculation module 011 can determine the value of the above-mentioned coefficients m and n.

Figure 9A:
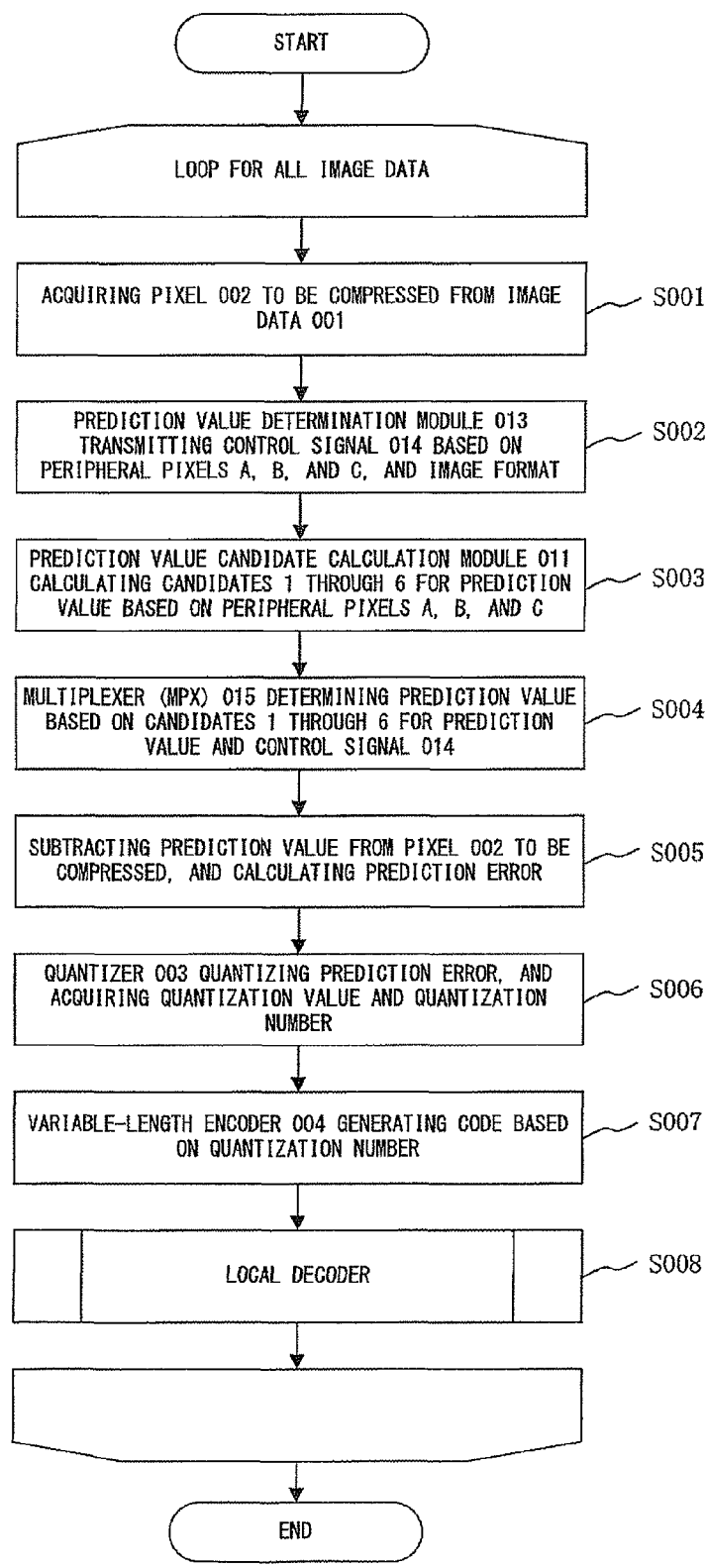
FIG. 9A is a flowchart for explanation of the operation of the image data compression (encoding) device according to an embodiment of the present invention.
Figure 9B:
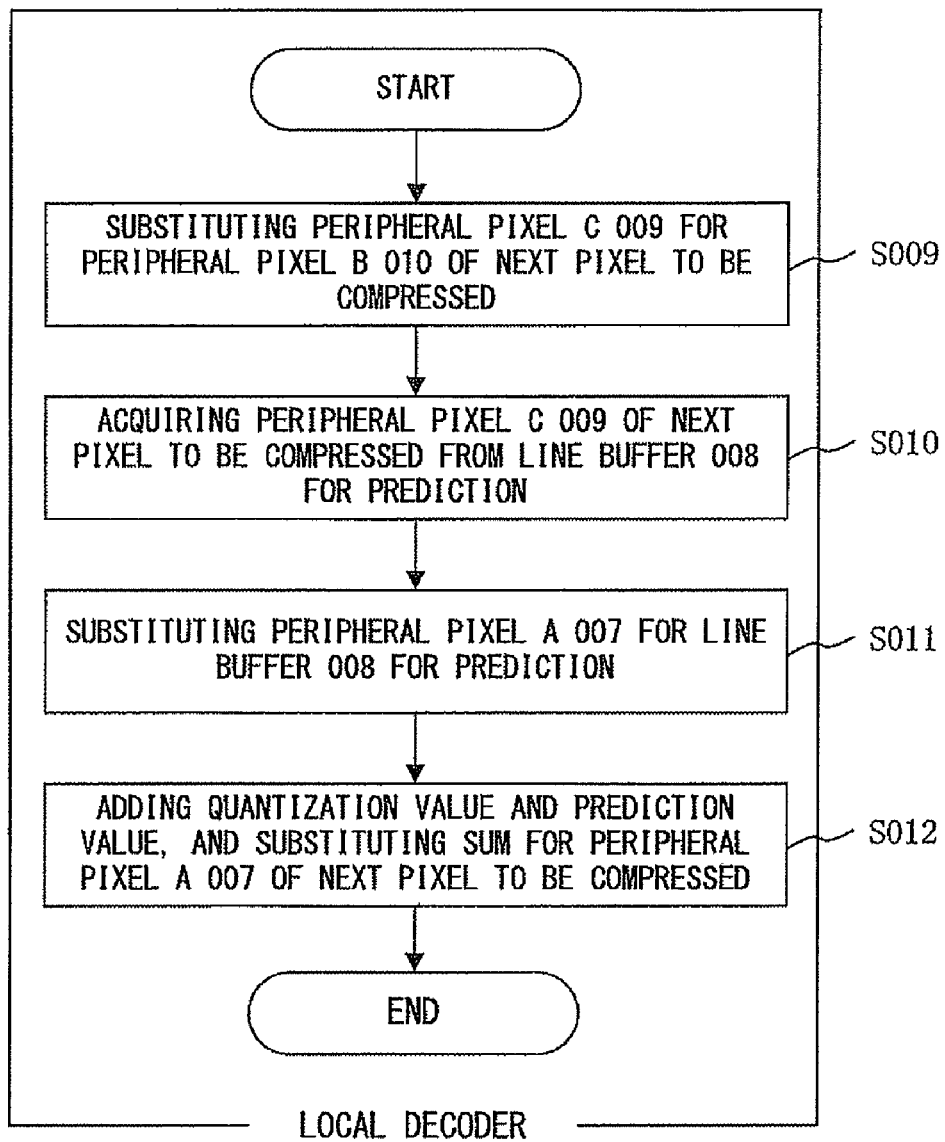
FIG. 9B is a flowchart for explanation of the process of the "local decoder" in step S008 in FIG. 9A.

FIG. 9A is a flowchart for explanation of the operation of the image data compression (coding) device according to an embodiment of the present invention. FIG. 9B is a flowchart for explanation of the process of the "local decoder" in step S008 shown in FIG. 9A. In FIGS. 9A and 9B, S is short for step.

Before describing the steps shown in FIG. 9A, it is to be noted that the process enters the loop until all image data is processed in the present embodiment.

S001: The pixel X (002) to be compressed is acquired from the image data 001.

S002: The continuity evaluation result feedback module 013 compares the pixel level values among the peripheral pixels A (007), C (009), and B (010). Based on the comparison result and the image format 012, and with reference to the correspondence tables shown in FIGS. 6 and 7, the control signal 014 is transmitted to the multiplexer (MPX) 015.

S003: The prediction value candidate calculation module 011 calculates the candidates 1 through 6 for a prediction value on the basis of the peripheral pixels A (007), C (009), and B (010). In this case, a prediction value is calculated by an integer operation and a shift operation. Then, during the integer operation of $(2A+C-B+1)/2$ and $(A+C+1)/2$, the digits to the right of the decimal point are discarded. During the real number operation, 1 is added, and no digits are discarded and the value of $(2A+C-B)/2$ and $(A+C)/2$ are used as is.

S004: The MPX 015 determines a prediction value according to the candidates 1 through 6 for a prediction value and the control signal 014.

S005: The prediction value 006 is subtracted from the pixel level value of the pixel X 002 to be compressed, and the prediction error is calculated.

S006: The prediction error is quantized by the quantizer 003, and a quantization value and a quantization number are acquired.

S007: A variable-length code is generated on the basis of the quantization number using the variable-length encoder 004. The code can be a Golomb code, or an arithmetic code.

S008: To compress the next pixel, the peripheral pixels A, B, and C, and the line buffer 008 for prediction are updated (local decoder).

S009: The peripheral pixel C (009) is substituted for the peripheral pixel B (010) of the next pixel to be compressed.

S010: The peripheral pixel C (009) of the next pixel to be compressed is acquired from the line buffer 008 for prediction.

S011: The peripheral pixel A (007) is substituted for the line buffer 008 for prediction.

S012: The quantization value and the prediction value are added up, and the sum is substituted for the peripheral pixel A (007) of the next pixel to be compressed.

In addition, for example, the line buffer 008 for prediction and the pixel X (002) to be compressed refer to the values as shown in FIG. 10, quantization results of a prediction device for an interlace image and a prediction device for a progressive image are represented as the tables shown in FIGS. 11 and 12. When the line buffer 008 for prediction and the pixel X (002) to be compressed have the pixel values as shown in FIG. 10, the tables shown in FIGS. 11 and 12 can be easily derived from the operation of the image data compression (coding) device according to the embodiments of the present invention shown in FIGS. 9A and 9B. In this case, the pixel C (009) after the previous compression is the pixel B (010) after the current compression, and the previous "prediction value+ prediction error quantization value" is the current pixel A (007).

Figure 13:
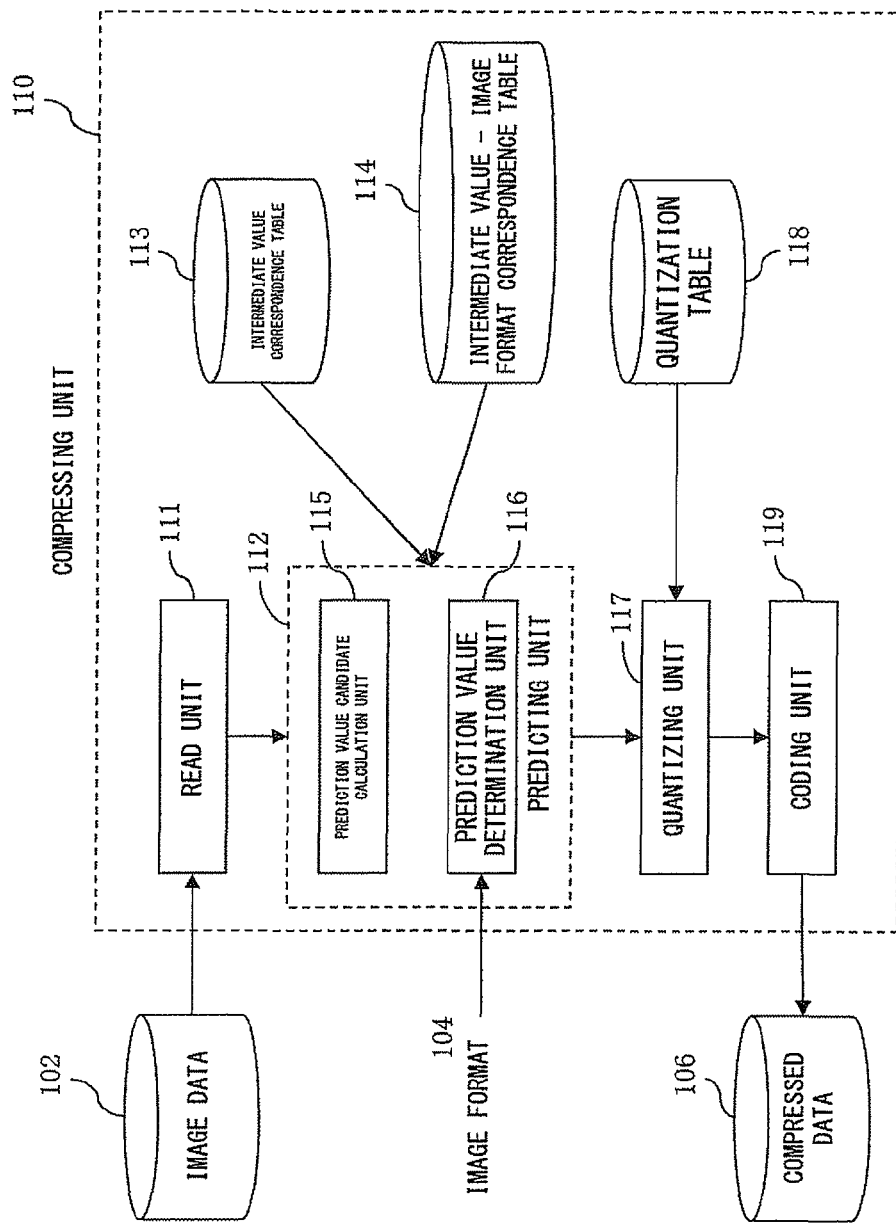
FIG. 13 is a block diagram of the configuration of the system of the image data compression device according to an embodiment of the present invention.

FIG. 13 is a block diagram of the configuration of the system of the image data compression device according to the embodiment of the present invention, and is realized by a block represented as the function of the contents described above. In FIG. 13, the image data compression device according to the embodiment of the present invention inputs the image data 102 to be compressed to the compressing unit 110, the compressing unit 110 first reads the input image data 102 by the read unit 111 for each line to extract a pixel to be compressed. The predicting unit 112 calculates on the extracted pixel to be compressed a candidate for a prediction value by a prediction value candidate calculation unit 115 corresponding to the prediction value candidate calculation module O1 shown in FIG. 3 with reference to an intermediate value correspondence table 113 shown in FIG. 6 and an intermediate value—image format correspondence table 114 shown in FIG. 7. A prediction value determination unit 116 corresponding to the MPX 015 determines a prediction value from among the candidates for a prediction value calculated on the basis of an image format 104, obtains a prediction error from the difference between the determined prediction value and the pixel to be compressed, and inputs the prediction error to a prediction value candidate calculation unit 115 corresponding to the quantizer 003. A quantizing unit 117 refers to a quantization table 118 as shown in FIG. 5, obtains a prediction error quantization value and a quantization number from the prediction error, inputs the quantization number, obtains a variable-length code (compressed code) from the quantization table 119 corresponding to the variable-length encoder 004, accumulates the code as the output of the compressing unit 110, and obtains compressed data 106.

Thus, according to the image data compression device of the present invention, the prediction value can be appropriately used depending on the image format, and the prediction error can be reduced on each image format, thereby enhancing the compression efficiency. Since only a prediction value is to be switched depending on the image format, a program and a circuit configuration for implementation can be simplified.

In the descriptions above, an intermediate value among A, B, and C is obtained and a candidate for a prediction value to be selected is determined on the basis of an intermediate value correspondence table, but an intermediate value of candidates for a prediction value can also be obtained after calculating the candidates for a prediction value.

Also in the description above, the prediction value for an interlace image is $(A+C)/2$, A and $(2A+C-B)/2$. However, the prediction value candidate calculation module 011 calculates "A", "$(m*A+n*C)/(m+n)$", and "$A+(m*A+n*C)/(m+n)-(m*A+n*B)/(m+n)$" using the coefficients m and n from the pixel level values A, B, and C, substitutes a value using coefficients m and n that are values (positive integers including 0) other than 0, and a sum of m and n is a value of i-th power of 2 so that the process in the shift operation can be performed, and can calculate a prediction value strong against the fluctuation of the pixel level value in the vertical direction using "A", "(A+3° C.)/4", and "(4*A+3C−3*B)/4" as the prediction value for an interlace image.

In addition, regardless of an interlace image or an progressive image as an image format, the prediction value can be used appropriately according to a signal indicating a sampling format of image data to attain similar effect.

For example, the sampling format of the image data stored on a common DVD is normally a 4:2:2 format. In this format, the image size of the Y component (brightness component) is 720×480, the horizontal image size of the C component (color component) is a half of the Y component. Therefore, since the C component refers to image data having a strong correlation in the vertical direction, problems can be solved by making the value of n larger than the value of m. That is, by increasing the gravity to the peripheral pixel having a strong correlation in the vertical direction (increasing the value of n), the degradation of the prediction error can avoided. For example, in the interlace image having the image data of a sampling format of 4:2:2 and the image size of 720×480, the image data having a strong correlation in the vertical direction is processed using m=1 and n=3 for the C component. For the Y component, image data having a strong correlation in the horizontal direction is processed using m=1 and n=1 in the case of the image size 720×480. Relating to the coefficients m and n when the image data has a strong correlation in the horizontal direction, the value of m is assigned the same value of n. If the degradation of the prediction error still advances, the value of m is further increased. Furthermore, when the sampling format of the image data as another example is a 4:4:4 format and the image size is 800×800 as a progressive image, m=0 and n=1.

Furthermore, since only field memory (buffer of 1 line) is used, and no frame memory is required, the implementation cost can be reduced.

In the description above, the prediction value candidate calculation module 011 calculates k (6 in the description above) candidates for a prediction value, and selects one prediction value by the multiplexer (MPX) 015 according to a control signal narrowed with reference to FIGS. 6 and 7. In the process order, a candidate for a prediction value can be narrowed with reference to FIGS. 6 and 7, and a prediction value can be calculated with the same timing, and the process speed can be improved. That is, in each of the prediction value determination module and the prediction value calculation module, parallel processing is performed and each candidate for a prediction value is calculated, each candidate for a prediction value is calculated, and then a prediction value to be used can be determined, thereby performing data compression at a high speed by the parallel processing. In the prediction value determination module and the prediction value calculation module, an arithmetic process is performed using a table. Therefore, program processing can be performed at a high speed.

On the other hand, as the implementation when the configuration scale is reduced without overweighting the process speed, the intermediate value correspondence table shown in FIG. 6 is removed from the configuration, three prediction values are first calculated depending on the image format with reference to FIG. 7, and a intermediate value is directly obtained from the three prediction values. Furthermore, another pattern can be calculating and determining by which equation of a candidate for a prediction value using the intermediate value correspondence table shown in FIG. 6, and performing a calculating process by the determined equation only, thereby deleting the configuration of selecting one prediction value from among a plurality of calculated prediction values.

The image data compression device according to the present invention processes image data passing like a stream in the order from upward to downward on the screen in a frame unit for a progressive image and in a field unit for an interlace image. The compressed data after the compression coding is put in a packet and transferred in accordance with the transmission rules of the transmission line connected to the present device.

Figure 14:
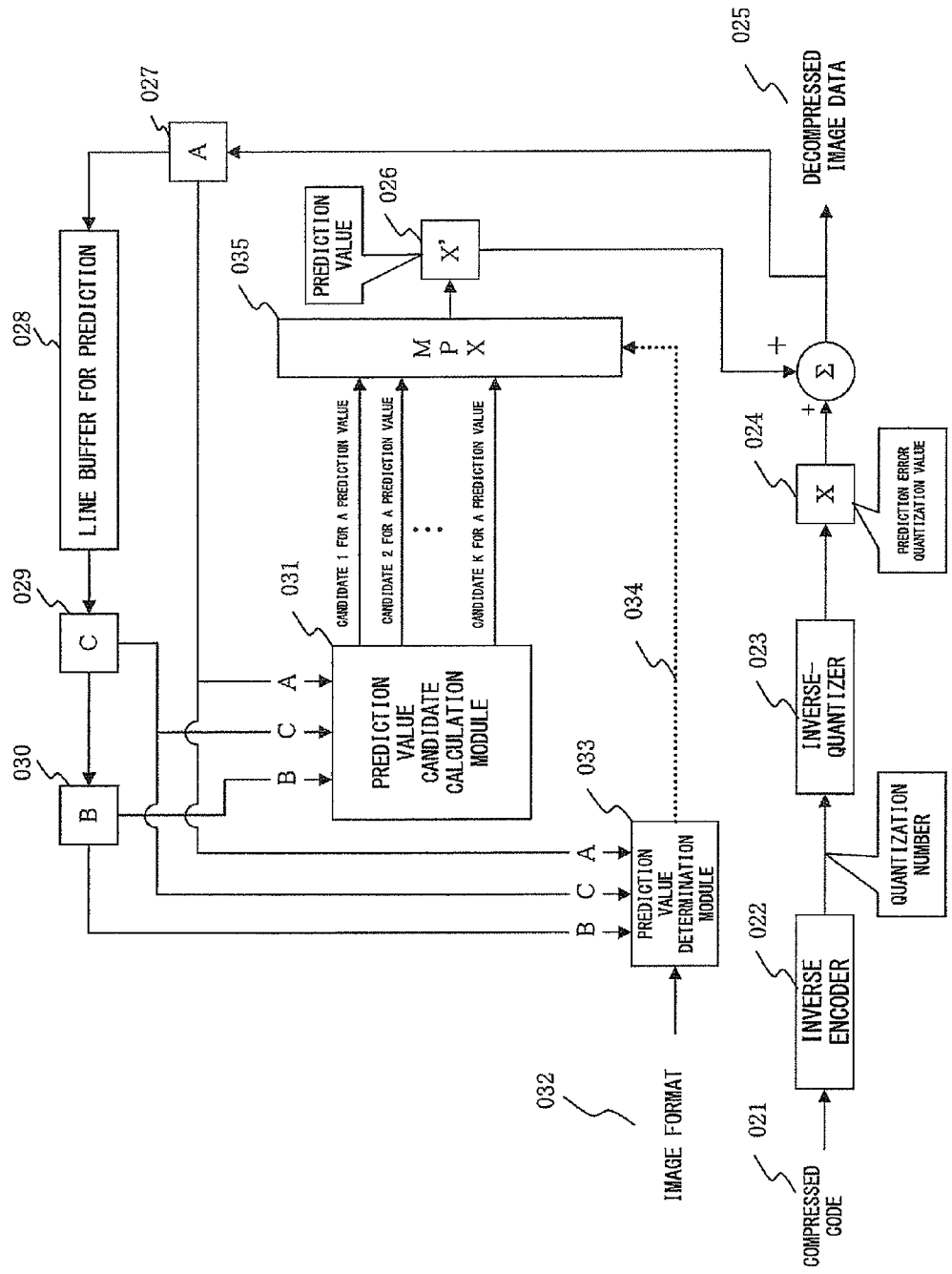
FIG. 14 is a block diagram of the configuration of the image data decompression device according to an embodiment of the present invention.

FIG. 14 is a block diagram showing the configuration of the image data decompression (decoding) device according to the embodiment of the present invention. In FIG. 14, a compressed code 021 refers to a compressed code of image data variable-length encoded as the output of the image data compression (coding) device according to an embodiment of the present invention shown in FIG. 3. An inverse encoder 022 receives a compressed code of image data, and outputs a quantization number corresponding to the code. A inverse-quantizer 023 receives the quantization number and outputs a prediction error quantization value X (024).

FIG. 15 is an inverse quantization table showing the correspondence of the prediction error quantization value to the quantization number provided for the inverse-quantizer 023. The inverse quantization table shown in FIG. 15 receives the quantization number and outputs the prediction error quantization value. The correspondence between the prediction error quantization value and the quantization number shown in FIG. 15 has to be consistent between the decompressing side and the compressing side. Therefore, the compressing side is provided with a quantization table (FIG. 5) showing the correspondence between the prediction error quantization value and the quantization number corresponding to FIG. 15.

FIG. 16 shows the arrangement of the pixel X to be decompressed and the peripheral pixel when an image format 032 is, for example, an interlace image or a progressive image. In FIG. 5, the lines are shown as broken lines.

The prediction error quantization value X (024) is added to a prediction value X' (026) to obtain decompressed image data 025, and can be the peripheral pixel A (027) as the next pixel to be decompressed.

A peripheral pixel A (027) is a pixel left to the pixel to be decompressed as shown in FIG. 6. A line buffer for prediction 028 holds about one line of quantization result for prediction, and is configured by, for example, a shift register. As shown in FIG. 16, a peripheral pixel C (029) is a pixel above the pixel to be decompressed (in the preceding line), and a peripheral pixel B (030) is a pixel upper left to the pixel to be decompressed (in the preceding line).

The prediction value X' (026) is one of the candidates for a prediction value calculated by the prediction value candidate calculation module 031 on the basis of the peripheral pixels A (027), C (029), and B (030), but the calculation of a candidate for a prediction value when the image format is a progressive image is first described below. As shown in FIG. 16, in the case of a progressive image, using the pixel level values of the two pixels C and B in the previous line processed and the prediction level value of the previous pixel processed in the same line, the candidate for a prediction value for the prediction value X' (026) is A, C, (A+C−B) with the correlation among three directions taken into account.

Described next is the calculation of a candidate for a prediction value when the image format is an interlace image. As shown in FIG. 16, in the case of an interlace image, an even line and an odd line are alternately transmitted. Therefore, when processing is performed in a line unit without frame memory, pixels processed in the second line above, which have weaker correlations, are used. Therefore, without using the pixel level values of the pixels C and B in the second previous line processed, the pixel C' between the pixel C and the pixel X, and the pixel B' between the pixel B and the pixel A are assumed, and the process as with the above-mentioned progressive image is to be performed using an interpolation value "(A+C)/2" between the pixels A and C and the interpolation value "(2A+C−B)/2" between the pixels A and B, and furthermore, the candidate for a prediction value for the prediction value X' (006) is defined as A, (A+C)/2, (2A+C−B)/2 using the pixel level value of the pixel A as the previous pixel processed in the same line in addition to the pixel C' and the pixel B', that is, with the correlation among the three directions taken into account.

Thus, the prediction value candidate calculation module 031 calculates the following candidates 1 through k (k=6 in the description of the present embodiment) for a prediction value on the basis of the peripheral pixels A (027), C (029), and B (030), and transmits the calculation results to the multiplexer (MPX) 035.

candidate for a prediction value 1: (A+C)/2
candidate for a prediction value 2: A
candidate for a prediction value 3: (2A+C−B)/2
candidate for a prediction value 4: C
candidate for a prediction value 5: A
candidate for a prediction value 6: A+C−B In the calculation above, the prediction value candidate calculation module 031 can determine a prediction value for an interlace image as an intermediate value of three candidates for a prediction value "A", "(m*A+n*C)/(m+n)", and "A+(m*A+n*C)/(m+n)−(m*A+n*B)/(m+n)" using coefficients m and n that are values (positive integers including 0) other than 0, and a sum of m and n is a value of i-th power of 2 so that the process in the shift operation can be performed. To obtain the above-mentioned prediction value, the prediction value candidate calculation module 031 calculates the three candidates for a prediction value "A", "(m*A+n*C)/(m+n)", and "A+(m*A+n*C)/(m+n)−(m*A+n*B)/(m+n)" as the candidates for a prediction value 7 through 9 in addition to the above-mentioned candidates for a prediction value 1 through 6. As a result, the value of k is 9. That is, to an interlace image with the coefficients m and n taken into account, one image format is added in addition to the interlace image or the progressive image without the consideration of the above-mentioned coefficients. Therefore, the value of k is 9. Furthermore, if the number of image format increases, the number of k is three times the number of the image formats.

As the coefficients m and n, for example, as an interlace-oriented prediction value using m=1 and n=2, a prediction value that is strong against the fluctuation of the pixel level value in the vertical direction can be calculated using "A", "(A+3° C.)/4", and "(4*A+3C−3*B)/4". That is, for the image having a strong correlation in the vertical direction is processed using the value of n larger than the value of m. The values of the above-mentioned coefficients in the case of a progressive image are m=0 and n=1 so that a prediction value similar to the value obtained for the conventional MAP prediction device can be acquired.

The image format 032 is presented from the image processing device (not shown in the attached drawings) to the image data compression device. However, an image data format is generally represented as a signal indicating in which direction the image has a strong pixel correlation, the horizontal direction or the vertical direction. That is, the above-mentioned interlace image has a strong pixel correlation in the horizontal direction, and the above-mentioned progressive image has a strong pixel correlation in the vertical direction (the pixel correlation in the horizontal direction is not necessarily stronger than the pixel correlation in the vertical direction). The same holds true with the case in which the image format is a sampling format of the image data according to the signal.

The prediction value determination module 013 determines which in the candidates 1 through k for a prediction value is set as a prediction value on the basis of two correspondence tables shown in FIGS. 6 and 7, and transmits it as a control signal 014 to the multiplexer (MPX) 015. FIG. 6 is an intermediate value correspondence table for comparing the pixel level values of the peripheral pixels A, B, and C, calculating the intermediate value of the peripheral pixels A, B, and C, and narrowing the candidates for a prediction value into the candidates (1) through (3) for a prediction value. Corresponding to FIG. 17, the intermediate value correspondence table (6) showing the correspondence between the candidates for a prediction value (1) through (3) and the intermediate value is provided for the compressing side.

FIG. 18 is an intermediate value—image format correspondence table used in transmitting to the multiplexer (MPX) 015 the candidates (1) through (3) for a prediction value narrowed in FIG. 17 and the control signal 034 indicating which in the candidates 1 through k for a prediction value is finally to be used as a prediction value depending on whether the image format 032 is an interlace image or a progressive image. What is output as the control signal 034 is a 3-bit (000~101) signal as shown in the correspondence table in FIG. 7. In addition, as described above, when the calculation output of the three candidates for a prediction value "A", "(m*A+n*C)/(m+n)", and "A+(m*A+n*C)/(m+n)−(m*A+n*B)/(m+n)" about an interlace image with the coefficients m and n taken into account is added, the candidates for a prediction value "A", "(m*A+n*C)/(m+n)", and "A+(m*A+n*C)/(m+n)−(m*A+n*B)/(m+n)" identified by a control signal (represented by 4 bits in this case) are added to the image column having a strong pixel correlation in the horizontal direction with respect to the candidates (1) through (3) for a prediction value. Therefore, with respect to FIG. 18, the decompressing side is provided with an intermediate value—image format correspondence table (FIG. 18) indicating the correspondence between the intermediate value and the image format.

The multiplexer (MPX) 035 determines which of the candidates 1 through k for a prediction value is selected as a prediction value according to the control signal 034. FIG. 19 is a correspondence table showing the correspondence between the control signal 034 and the above-mentioned candidates for a prediction value 1 through 6. That is, a control signal (000) corresponds to a candidate 1 for a prediction value, a control signal (001) corresponds to a candidate 2 for a prediction value, a control signal (010) corresponds to a candidate 3 for a prediction value, a control signal (011) corresponds to a candidate 4 for a prediction value, a control signal (100) corresponds to a candidate 5 for a prediction value, and a control signal (101) corresponds to the candidate 6 for a prediction value. As described above, when the calculation output of the three candidates for a prediction value "A", "(m*A+n*C)/(m+n)", and "A+(m*A+n*C)/(m+n)−(m*A+n*B)/(m+n)" for an interlace image with the coefficients m and n taken into account are added from the prediction value candidate calculation module 031, the candidates for a prediction value "A", "(m*A+n*C)/(m+n)", and "A+(m*A+n*C)/(m+n)−(m*A+n*B)/(m+n)" are added as the candidates for a prediction value to be used in the table shown in FIG. 19. In addition, a control signal (a 4-bit signal in this case) having a bit width for identification of the three candidates for a prediction value with the control signal added is required. The correspondence between the control signal and the candidate for a prediction value shown in FIG. 19 is to be consistent between the compressing side and the decompressing side. With respect to FIG. 19, a correspondence table (FIG. 19) showing the correspondence between the control signal and the candidate for a prediction value is provided for the compressing side. Although 3-bit control signals (000) through (101) are associated as the control signal 034 according to the present embodiment, the control signal not in this format can also be used so far as the candidates 1 through 6 for a prediction value can be associated.

In addition, a correspondence table indicating according to the signal about a sampling format of image data which prediction value is to be used is stored in the prediction value determination module 033 regardless of the interlace image or the progressive image, and a prediction value can be determined on the basis of the correspondence table.

Although not shown in the attached drawings, a control signal indicating the sampling format of the image data is transmitted from the prediction value determination module 033 to the prediction value candidate calculation module 031. Based n the signal, the prediction value candidate calculation module 031 can determine the value of the above-mentioned coefficients m and n.

Figure 20B:
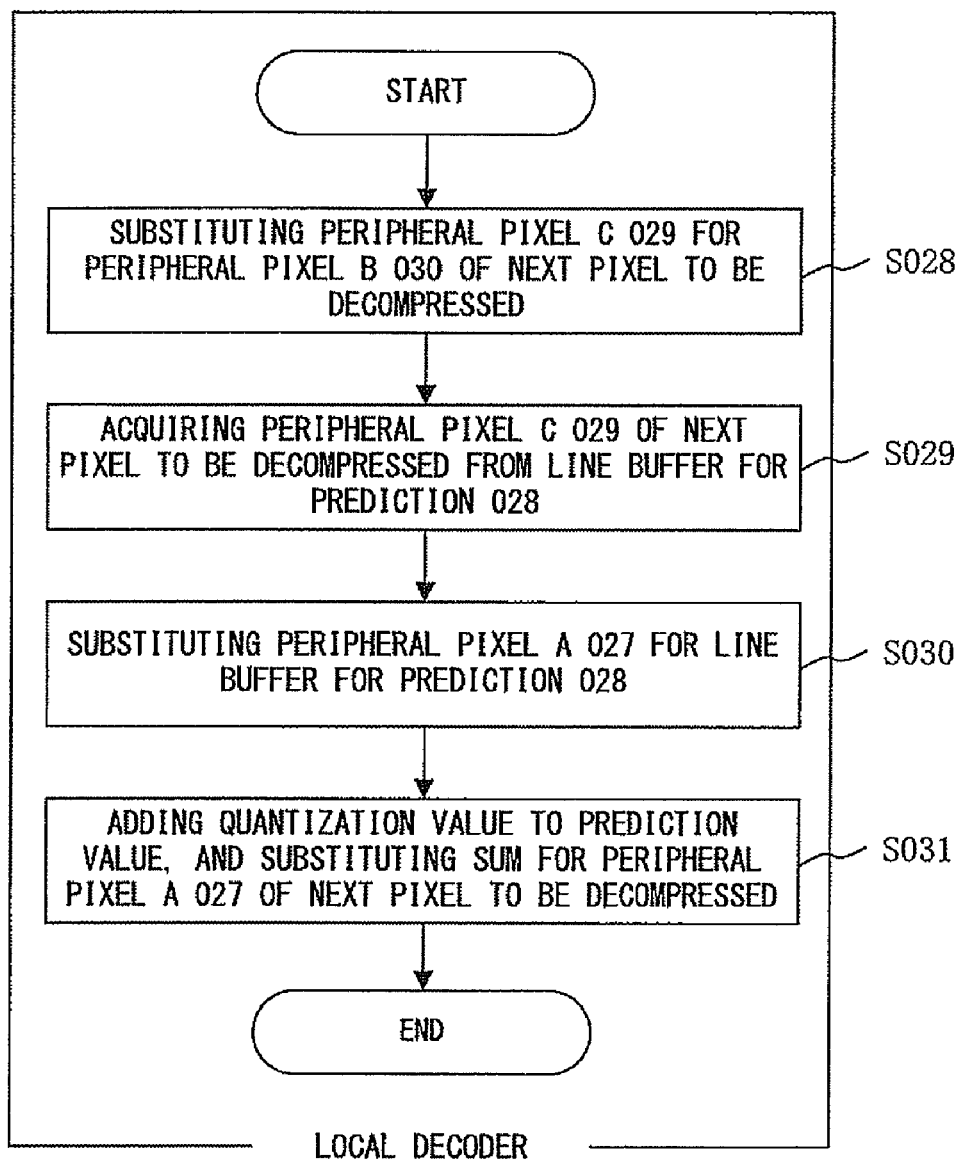
FIG. 20B is a flowchart for explanation of the process of the "local decoder" in step S027 in FIG. 20A.

FIG. 20A is a flowchart for explanation of the operation of the image data compression (coding) device according to an embodiment of the present invention. FIG. 20B is a flowchart for explanation of the process of the "local decoder" in step S027 shown in FIG. 20A. In FIGS. 20A and 20B, S is short for step.

Before describing the steps shown in FIG. 20A, it is to be noted that the process enters the loop until all image data is processed in the present embodiment.

S021: Compressed code 021 is input to the inverse encoder 022, and a quantization number is output.

S022: The quantization number is input to the inverse-quantizer 023, and a quantization number is output.

S023: The continuity evaluation result feedback module 033 compares the pixel level values among the peripheral pixels A (027), C (029), and B (030). Based on the comparison result and the image format 032, and with reference to the correspondence tables shown in FIGS. 17 and 18, the control signal 034 is transmitted to the multiplexer (MPX) 035.

S024: The prediction value candidate calculation module 031 calculates the candidates 1 through 6 for a prediction value on the basis of the peripheral pixels A (027), C (029), and B (030). In this case, a prediction value is calculated by an integer operation and a shift operation. Then, during the integer operation of (2A+C−B+1)/2 and (A+C+1)/2, the digits to the right of the decimal point are discarded. During the real number operation, 1 is added, and no digits are discarded and the value of (2A+C−B)/2 and (A+C)/2 are used as is.

S025: The MPX 035 determines a prediction value according to the candidates 1 through 6 for a prediction value and the control signal 034.

S026: The quantization value of the prediction error acquired in S022 is added to the prediction value acquired in S024 to calculate a pixel to be decompressed (decompressed image data 025).

S027: To decompress the next pixel, the peripheral pixels A, B, and C, and the line buffer 028 for prediction are updated (local decoder).

S028: The peripheral pixel C (029) is substituted for the peripheral pixel B (030) of the next pixel to be decompressed.

S029: The peripheral pixel C (029) of the next pixel to be decompressed is acquired from the line buffer 028 for prediction.

S030: The peripheral pixel A (027) is substituted for the line buffer 028 for prediction.

S031: The quantization value and the prediction value are added up, and the sum is substituted for the peripheral pixel A (027) of the next pixel to be decompressed.

In addition, for example, the line buffer 028 for prediction refers to the value as shown in FIG. 21, quantization results of a prediction device for an interlace image and a prediction device for a progressive image are represented as the tables shown in FIGS. 22 and 23. When the line buffer 028 for prediction has the pixel value as shown in FIG. 21, the tables shown in FIGS. 22 and 23 can be easily derived from the operation of the image data decompression (decoding) device according to the embodiments of the present invention shown in FIGS. 20A and 20B. In this case, the pixel C (029) after the previous decompression is the pixel B (030) after the current decompression, and the previous "prediction value+prediction error quantization value" is the current pixel A (027).

Figure 24:
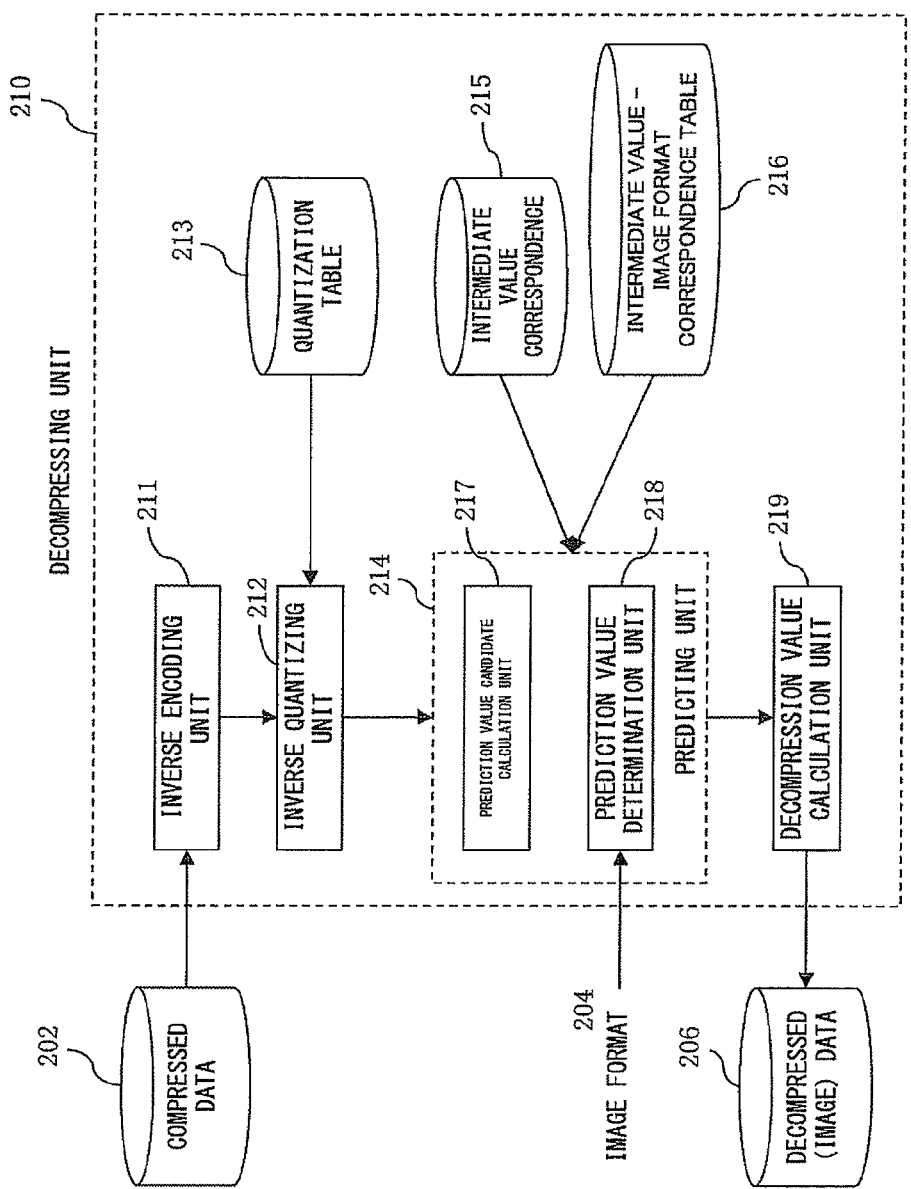
FIG. 24 is a block diagram of the configuration of the system of the image data decompression device according to an embodiment of the present invention.

FIG. 24 is a block diagram of the configuration of the system of the image data decompression device according to the embodiment of the present invention, and is realized by a block represented as the function of the contents described above. In FIG. 24, the image data decompression device according to the embodiment of the present invention inputs the image data 202 as the output of the image data compression device to the decompressing unit 210, the decompressing unit 210 inputs the input image data 202 to the inverse encoding unit 211 corresponding to the inverse encoder 022 shown in FIG. 14, and obtains a quantization number from the inverse encoding unit 211. Then, the quantization number is input to the inverse quantizing unit 212 corresponding to the inverse-quantizer 023. The inverse quantizing unit 212 obtains a prediction error quantization value from the quantization number with reference to the inverse quantization table 213 as shown in FIG. 15. The obtained prediction error quantization value is input to the predicting unit 214. The predicting unit 214 refers to the intermediate value correspondence table 215 as shown in FIG. 17, and the intermediate value—image format correspondence table 216 as shown in FIG. 18, calculates a candidate for a prediction value by the prediction value candidate calculation unit 217 corresponding to prediction value candidate calculation module 031, and determines a prediction value from among the candidates for a prediction value calculated by the prediction value candidate calculation unit 217 by the prediction value determination unit 218 corresponding to the MPX 035 on the basis of the image format 204. Then, the predicting unit 214 outputs the prediction error quantization value calculated by the prediction value candidate calculation unit 217 as output and a prediction value determined by the prediction value determination unit 218, and inputs the output prediction value and the prediction error quantization value to the decompression value calculation unit 219. The decompression value calculation unit 219 adds up the input prediction value and prediction error quantization value to obtain a decompressed pixel value, accumulates the value, and obtains the decompressed (image) data 206.

Thus, according to the image data decompression device of the present invention, the prediction value can be appropriately used depending on the image format, and the prediction error can be reduced on each image format, thereby enhancing the decompression efficiency. Since only a prediction value is to be switched depending on the image format, a program and a circuit configuration for implementation can be simplified.

In the descriptions above, an intermediate value among A, B, and C is obtained and a candidate for a prediction value to be selected is determined on the basis of an intermediate value correspondence table, but an intermediate value of candidates for a prediction value can also be obtained after calculating the candidates for a prediction value.

Also in the description above, the prediction value for an interlace image is (A+C)/2, A and (2A+C−B)/2. However, the prediction value candidate calculation module calculates "A", "(m*A+n*C)/(m+n)", and "A+(m*A+n*C)/(m+n)−(m*A+n*B)/(m+n)" using the coefficients m and n from the pixel level values A, B, and C, substitutes a value using coefficients m and n that are values other than 0, and can calculate a prediction value strong against the fluctuation of the pixel level value in the vertical direction using "A", "(A+3C)/4", and "(4*A+3C−3*B)/4" as the prediction value for an interlace image. Furthermore, the prediction value determination module and the prediction value calculation module can perform parallel processing, and a prediction value to be used can be determined after each candidate for a prediction value is calculated. Therefore, the parallel processing can perform data decompression at a high speed.

In addition, regardless of an interlace image or an progressive image as an image format, the prediction value can be used appropriately according to a signal indicating a sampling format of image data to attain similar effect.

For example, the sampling format of the image data stored on a common DVD is normally a 4:2:2 format. In this format, the image size of the Y component (brightness component) is 720×480, the horizontal image size of the C component (color component) is a half of the Y component. Therefore, since the C component refers to image data having a strong correlation in the vertical direction, problems can be solved by making the value of n larger than the value of m. That is, by increasing the gravity to the peripheral pixel having a strong correlation in the vertical direction (increasing the value of n), the degradation of the prediction error can avoided. For example, in the interlace image having the image data of a sampling format of 4:2:2 and the image size of 720×480, the image data having a strong correlation in the vertical direction is processed using m=1 and n=3 for the C component. For the Y component, image data having a strong correlation in the horizontal direction is processed using m=1 and n=1 in the case of the image size 720×480. Relating to the coefficients m and n when the image data has a strong correlation in the horizontal direction, the value of m is assigned the same value of n. If the degradation of the prediction error still advances, the value of m is further increased. Furthermore, when the sampling format of the image data as another example is a 4:4:4 format and the image size is 800×800 as a progressive image, m=0 and n=1.

Furthermore, since only field memory (buffer of 1 line) is used, and no frame memory is required, the implementation cost can reduced. Furthermore, since an interlace image and a progressive image can be processed only by switching prediction values, the circuit scale can be simplified.

In the description above, the prediction value candidate calculation module 031 calculates k (6 in the description above) candidates for a prediction value, and selects one prediction value by the multiplexer (MPX) 035 according to a control signal narrowed with reference to FIGS. 17 and 18. In the process order, a candidate for a prediction value can be narrowed with reference to FIGS. 17 and 18, and a prediction value can be calculated with the same timing, and the process speed can be improved. That is, in each of the prediction value determination module and the prediction value calculation module, parallel processing is performed and each candidate for a prediction value is calculated, each candidate for a prediction value is calculated, and then a prediction value to be used can be determined, thereby performing data compression at a high speed by the parallel processing. In the prediction value determination module and the prediction value calculation module, an arithmetic process is performed using a table. Therefore, program processing can be performed at a high speed.

On the other hand, as the implementation when the configuration scale is reduced without overweighting the process speed, the intermediate value correspondence table shown in FIG. 17 is removed from the configuration, three prediction values are first calculated depending on the image format with reference to FIG. 18, and a intermediate value is directly obtained from the three prediction values. Furthermore, another pattern can be calculating and determining by which equation of a candidate for a prediction value using the intermediate value correspondence table shown in FIG. 17, and performing a calculating process by the determined equation only, thereby deleting the configuration of selecting one prediction value from among a plurality of calculated prediction values.

APPLICABILITY IN INDUSTRY

The image data compression device and the image data decompression device according to the present invention can be read as one-chip LSI to be loaded into a desired application equipment, and can be applied to, for example, a car-mounted video data transmission system including a car navigation system, various amusement (game, animation, etc.) equipment. For example, in a car-mounted video data transmission system, a display is provided on the rear side to supply video different from the front side. Therefore, the image data processed by the video data processing device implemented on the front side can be compressed and transmitted to the rear side. On the rear side, the transmitted image data is decompressed and displayed. When image data is relayed, the compressing and decompressing processes are repeated at each relay point.

What is claimed is:

1. An image data compression device, comprising a prediction device configured to predict a pixel level value of a pixel to be compressed when image data is compressed, performs encoding after quantizing a difference value between a prediction result of the prediction device and an actual pixel level value, or performs encoding on a basis of the difference value, wherein the prediction device calculates a plurality of candidates for a prediction value using a pixel level value around a pixel to be compressed for each of an image format represented as a signal indicating an image having a strong pixel correlation in a horizontal direction and an image format represented as a signal indicating an image having a strong pixel correlation in a vertical direction, narrows the plurality of candidates for the prediction on a basis of the pixel level value around the pixel to be compressed, and determines one of the narrowed candidates for the prediction value as the prediction value on a basis an image format of the image data which is represented as a signal indicating an image having a strong pixel correlation in a horizontal direction or a signal indicating an image having a strong pixel correlation in a vertical direction, wherein the image having a strong pixel correlation in the horizontal direction is an interlace image, and the image having a strong pixel correlation in the vertical direction is a progressive image, wherein a pixel left to the pixel to be compressed is defined as A, a pixel above the pixel to be compressed is defined as C, a pixel upper left to the pixel to be compressed is defined as B, and m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

2. The device according to claim 1, wherein one of the image having a strong pixel correlation in the horizontal direction and the image having a strong pixel correlation in the vertical direction is regulated in a sampling format.

3. The device according to claim 1, wherein the coefficients m and n are regulated on a basis of the sampling format.

4. The device according to claim 1, wherein the prediction device includes: a prediction value candidate calculation module configured to calculate for each of an image format represented as a signal indicating an image having a strong pixel correlation in a horizontal direction and an image format represented as a signal indicating an image having a strong pixel correlation in a vertical direction a plurality of candidates for a prediction value on a basis of value of peripheral pixels A, C, and B which are around the pixel to be compressed and in which the pixel A is defined as a pixel left to the pixel to be compressed, the pixel C is defined as a pixel above the pixel to be compressed, and the pixel B is defined as a pixel upper left to the pixel to be compressed; a prediction value determination module configured to narrow the plurality of candidates for the prediction value on a basis of the values of the pixel A, B, and C, determine one of the plurality of candidates for the prediction value as the prediction value on a basis of an image format of the image data which is represented as a signal indicating an image having a strong pixel correlation in a horizontal direction or a signal indicating an image having a strong pixel correlation in a vertical direction, and transmit a determined value as a control signal to a multiplexer; a multiplexer outputting as a prediction value one of the plurality of candidates for a prediction value according to the control signal; a plurality of registers configured to hold the peripheral pixels A, B, and C; and a line buffer holding one line of pixel values.

5. An image data compressing method for use with an image data compression device having a prediction device for predicting a pixel level value of a pixel to be compressed, comprising:

holding pixel values peripheral pixels A, C, and B around a pixel to be compressed and pixel values in a preceding line with the pixel A defined as a-pixel left to the pixel to be compressed, the pixel C defined as a pixel above the pixel to be compressed, and the pixel B defined as a pixel upper left to the pixel to be compressed before encoding data;

calculating a plurality of candidates for a prediction value on a basis of the pixel values of the held peripheral pixels A, C, and B for each of an image format represented as a signal indicating an image having a strong pixel correlation in a horizontal direction and an image format represented as a signal indicating an image having a strong pixel correlation in a vertical direction;

narrowing the plurality of candidates for the prediction value on a basis of the pixel values of the held peripheral pixels A, C, and B, determining as the prediction value one of the narrowed candidates for the prediction value on a basis of an image format of the image data which is represented as a signal indicating an image having a strong pixel correlation in a horizontal direction or a signal indicating an image having a strong pixel correlation in a vertical direction, and transmitting a control signal;

receiving the control signal and outputting one of the plurality of candidates for a prediction value as a prediction value; and calculating a prediction error from the output prediction value and the pixel to be compressed, inputting the calculated prediction error to a quantizer and acquiring a quantization number, and inputting the quantization number to an encoder and obtaining a compressed code, wherein the image having a strong pixel correlation in the horizontal direction is an interlace image, and the image having a strong pixel correlation in the vertical direction is a progressive image, wherein m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

6. A non-transitory recording medium on which is recorded a program for compressing image data while predicting a pixel level value of a pixel to be compressed, used to direct a computer to perform:

holding pixel values of peripheral pixels A, C, and B around a pixel to be compressed and pixel values in a preceding line with the pixel A defined as a pixel left to the pixel to be compressed, the pixel C defined as a pixel above the pixel to be compressed, and the pixel B defined as a pixel upper left to the pixel to be compressed before encoding data;

calculating a plurality of candidates for a prediction value on a basis of the pixel values of the held peripheral pixels A, C, and B for each of an image format represented as a signal indicating an image having a strong pixel correlation in a horizontal direction and an image format represented as a signal indicating an image having a strong pixel correlation in a vertical direction;

narrowing the plurality of candidates for the prediction value on a basis of the pixel values of the held peripheral pixels A, C, and B, determining as the prediction value one of the narrowed candidates for a prediction value on a basis of an image format of the image data which is represented as a signal indicating an image having a strong pixel correlation in a horizontal direction or a signal indicating an image having a strong pixel correlation in a vertical direction, and transmitting a control signal; and calculating prediction error from the output prediction value and the pixel to be compressed, inputting the prediction error to a quantization table, obtaining a quantization number, inputting the quantization number to a coding table, and obtaining a compressed code, wherein the image having a strong pixel correlation in the horizontal direction is an interlace image, and the image having a strong pixel correlation in the vertical direction is a progressive image, wherein m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

7. An image data decompression device which decompresses image data compressed by an image data compression device having a prediction device configured to determine a prediction value on a basis of a pixel level value of a pixel around a pixel to be compressed and an image format represented as a signal indicating an image having a strong pixel correlation in a horizontal direction or a signal indicating an image having a strong pixel correlation in a vertical direction, wherein the image data decompression device includes a prediction device configured to calculate a plurality of candidates for a prediction value using a pixel level value around a pixel to be decompressed for each of an image format represented as a signal indicating an image having a strong pixel correlation in a horizontal direction and an image format represented as a signal indicating an image having a strong pixel correlation in a vertical direction, narrow the plurality of candidates for the prediction value on a basis of the pixel level value around the pixel to be decompressed, and determine one of the narrowed prediction candidates for the prediction value as the prediction value on a basis of an image format of the image data which is represented as a signal indicating an image having a strong pixel correlation in a horizontal direction or a signal indicating an image having a strong pixel correlation in a vertical direction, the prediction value determined by the prediction device is added to a prediction error quantization value obtained through an inverse encoder and an inverse-quantizer, thereby obtaining a decompressed pixel data, and obtaining a next peripheral pixel value, wherein the image having a strong pixel correlation in the horizontal direction is an interlace image, and the image having a strong pixel correlation in the vertical direction is a progressive image, wherein a pixel left to the pixel to be compressed is defined as A, a pixel above the pixel to be decompressed is defined as C, a pixel upper left to the pixel to be compressed is defined as B, and m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

8. An image data decompressing method for use with an image data decompression device which decompresses image data compressed by an image data compression device having a prediction device for determining a prediction value on a basis of a pixel level value of a pixel around a pixel to be compressed and an image format, comprising:

holding pixel values of peripheral pixels A, C, and B around a pixel to be decompressed and pixel values in a preceding line with the pixel A defined as a pixel left to the pixel to be decompressed, the pixel C defined as a pixel above the pixel to be decompressed, and the pixel B defined as a pixel upper left to the pixel to be decompressed before decompressing a compressed code;

calculating a plurality of candidates for a prediction value on a basis of the pixel values of the held peripheral pixels A, C, and B for each of an image format represented as a signal indicating an image having a strong pixel correlation in a horizontal direction and an image format represented as a signal indicating an image having a strong pixel correlation in a vertical direction;

narrowing the plurality of candidates for the prediction value on a basis of the pixel values of the held peripheral pixels A, C, and B, determining as the prediction value one of the narrowed candidates for the prediction value on a basis of an image format of image data to be decompressed which is represented as a signal indicating an image having a strong pixel correlation in a horizontal direction or a signal indicating an image having a strong pixel correlation in a vertical direction, and transmitting a control signal;

receiving the control signal and outputting one of the plurality of candidates for a prediction value as a prediction value; and inputting compressed code data to an inverse encoder and acquiring a quantization number, inputting the quantization number to an inverse-quantizer and acquiring a prediction error quantization value, and decompressing a pixel value from the acquired prediction error quantization value and the prediction value, wherein the image having a strong pixel correlation in the horizontal direction is an interlace image, and the image having a strong pixel correlation in the vertical direction is a progressive image, wherein m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

9. A non-transitory recording medium on which is recorded a program for decompressing image data compressed by an image data compression device having a prediction device for determining a prediction value on a basis of a pixel level value of a pixel around a pixel to be compressed and an image format, used to direct a computer to perform:

holding pixel values of peripheral pixels A, C, and B around a pixel to be decompressed and pixel values in a preceding line with the pixel A defined as a-pixel left to the pixel to be decompressed, the pixel C defined as a pixel above the pixel to be decompressed, and the pixel B defined as a pixel upper left to the pixel to be decompressed before decompressing a compressed code;

calculating a plurality of candidates for a prediction value on a basis of the pixel values of the held peripheral pixels A, C, and B for each of an image format represented as a signal indicating an image having a strong pixel correlation in a horizontal direction and an image format represented as a signal indicating an image having a strong pixel correlation in a vertical direction;

narrowing the plurality of candidates for the prediction value on a basis of the pixel values of the held peripheral pixels A, C, and B, determining as the prediction value one of the narrowed candidates for the prediction value on a basis of an image format of image data to be decompressed which is represented as a signal indicating an image having a strong pixel correlation in a horizontal direction or a signal indicating an image having a strong pixel correlation in a vertical direction, and transmitting the value;

inputting compressed code data to an inverse encoder and acquiring a quantization number, inputting the quantization number to an inverse-quantizer and acquiring a prediction error quantization value, and decompressing a pixel value from the acquired prediction error quantization value and the prediction value, wherein the image having a strong pixel correlation in the horizontal direction is an interlace image, and the image having a strong pixel correlation in the vertical direction is a progressive image, wherein m and n are coefficients, and a candidate for the prediction value corresponding an intermediate value among A, B, and C is selected as the prediction value from among three candidates for a prediction value "A" which is a candidate for the prediction value corresponding A, "(m*A+n*C)/(m+n)" which is a candidate for the prediction value corresponding C, and "A+(m*A+n*C)/(m+n)−(m*A+n*B)/(m+n)" which is a candidate for the prediction value corresponding B, and wherein when the image data is a progressive image, m is 0 and n is 1, and when the image data is an interlace image, m is 1 and n is 1 or 3.

* * * * *